BEST AVAILABLE COPY
Sept. 16, 1947. J. J. VAN HORN Re. 22,915
RAILWAY TRAFFIC CONTROLLING APPARATUS
Original Filed Sept. 12, 1941 12 Sheets-Sheet 1
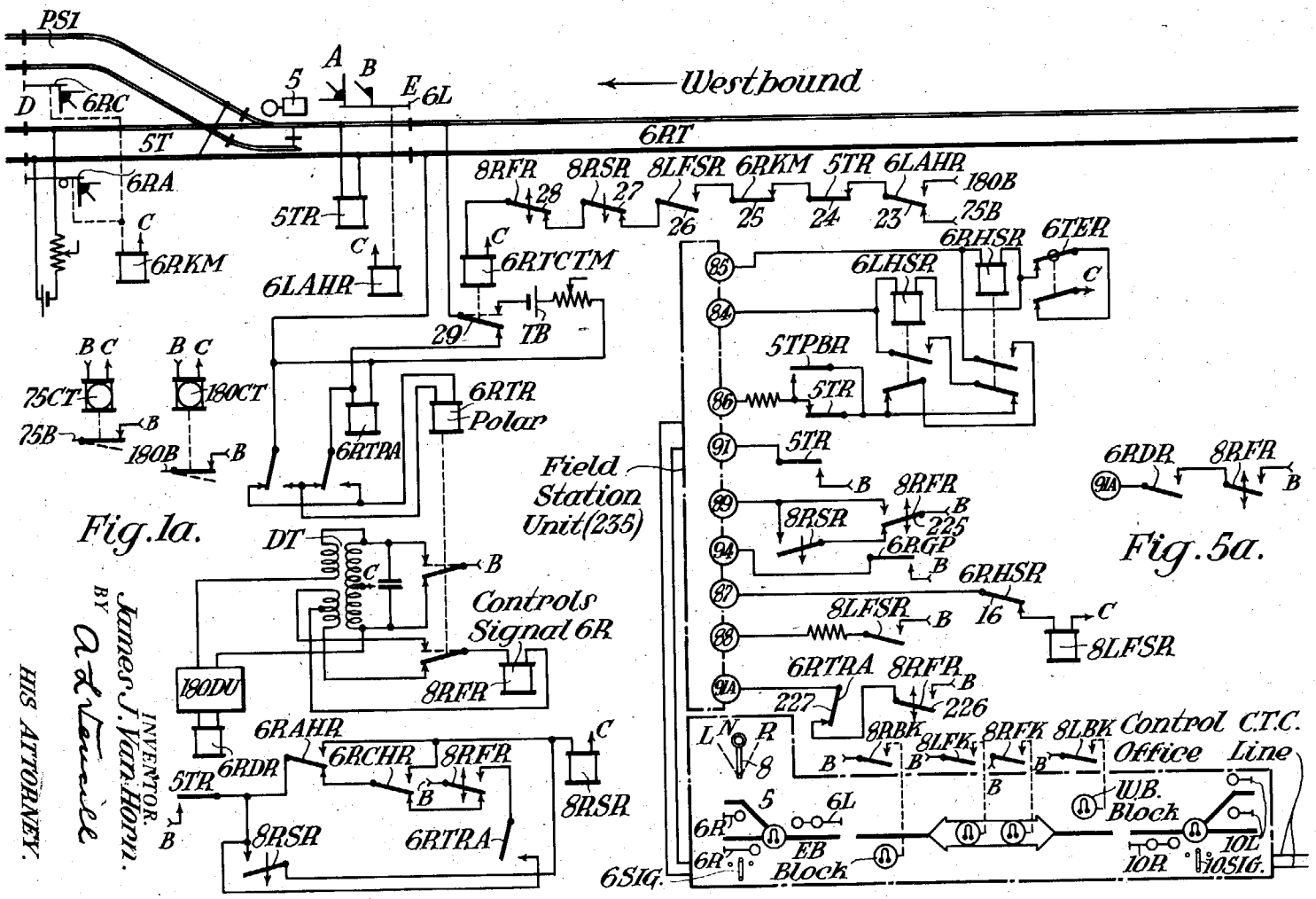

RAILWAY TRAFFIC CONTROLLING APPARATUS
Original Filed Sept. 12, 1941 12 Sheets-Sheet 2
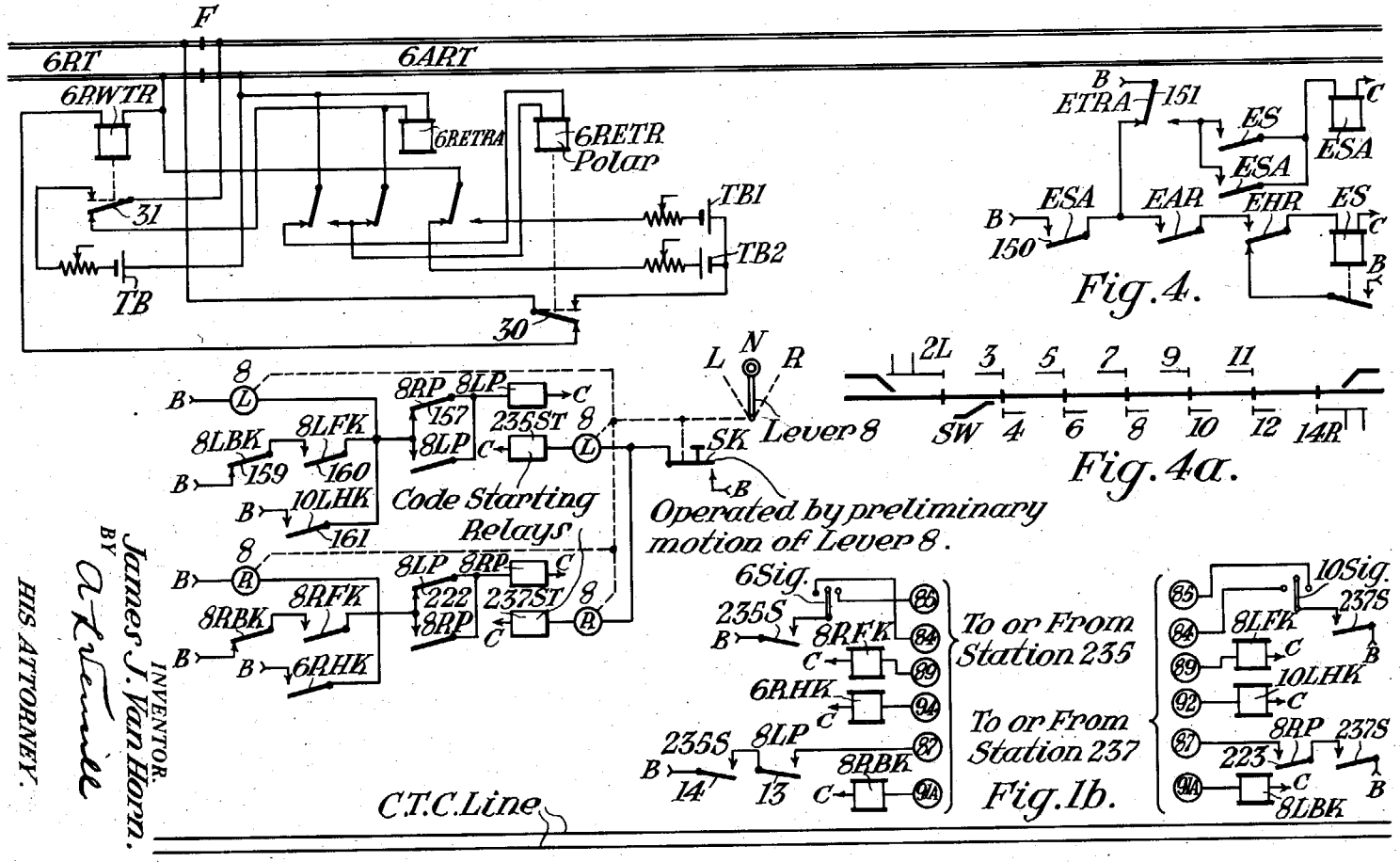

RAILWAY TRAFFIC CONTROLLING APPARATUS
Original Filed Sept. 12, 1941 12 Sheets-Sheet 3
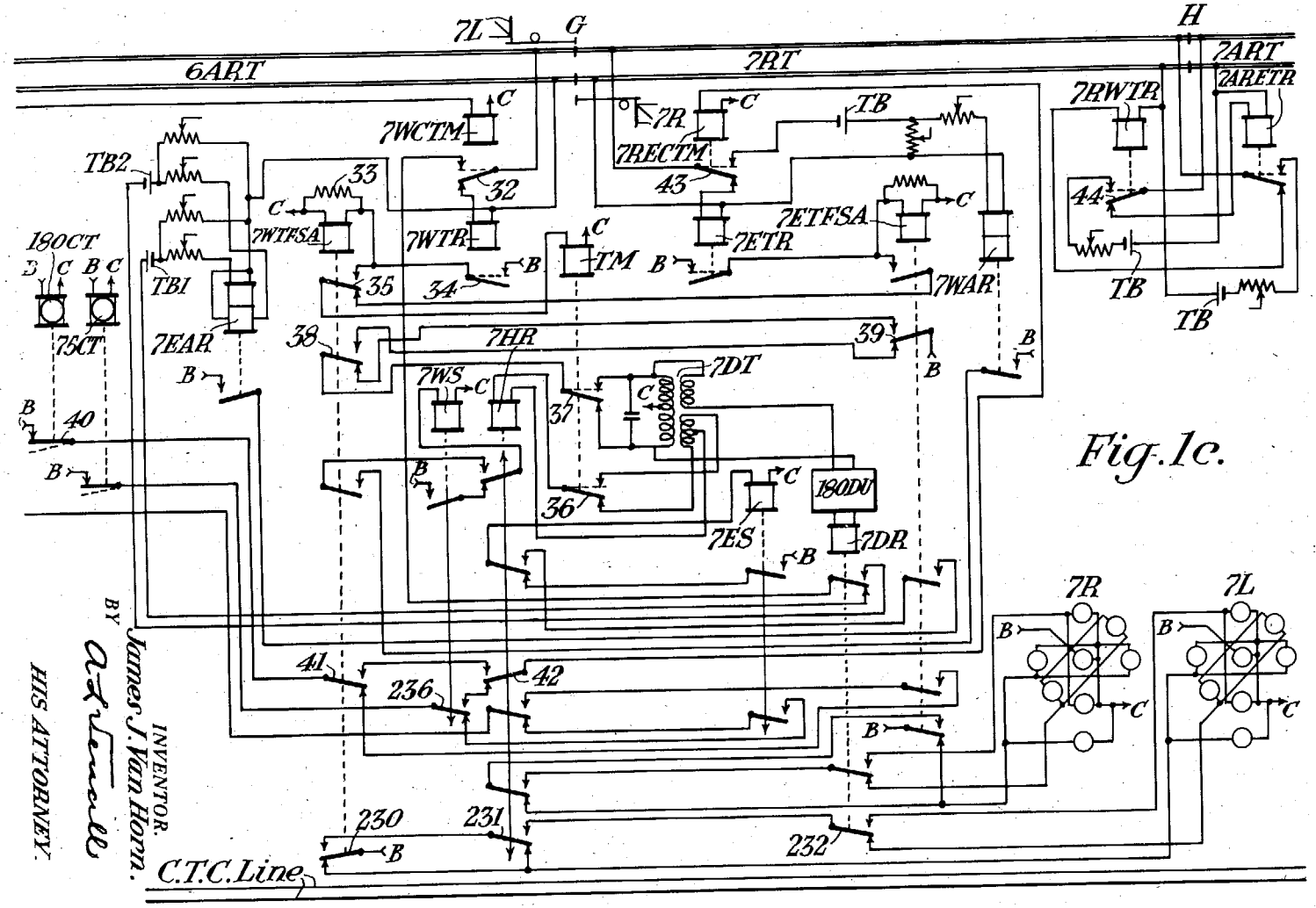
INVENTOR.
James J. Van Horn.
BY
A. L. Venable
HIS ATTORNEY.

RAILWAY TRAFFIC CONTROLLING APPARATUS

Original Filed Sept. 12, 1941 12 Sheets-Sheet 4

INVENTOR.
James J. Van Horn.
BY
A. L. Venuell
HIS ATTORNEY.

RAILWAY TRAFFIC CONTROLLING APPARATUS
Original Filed Sept. 12, 1941 12 Sheets-Sheet 5
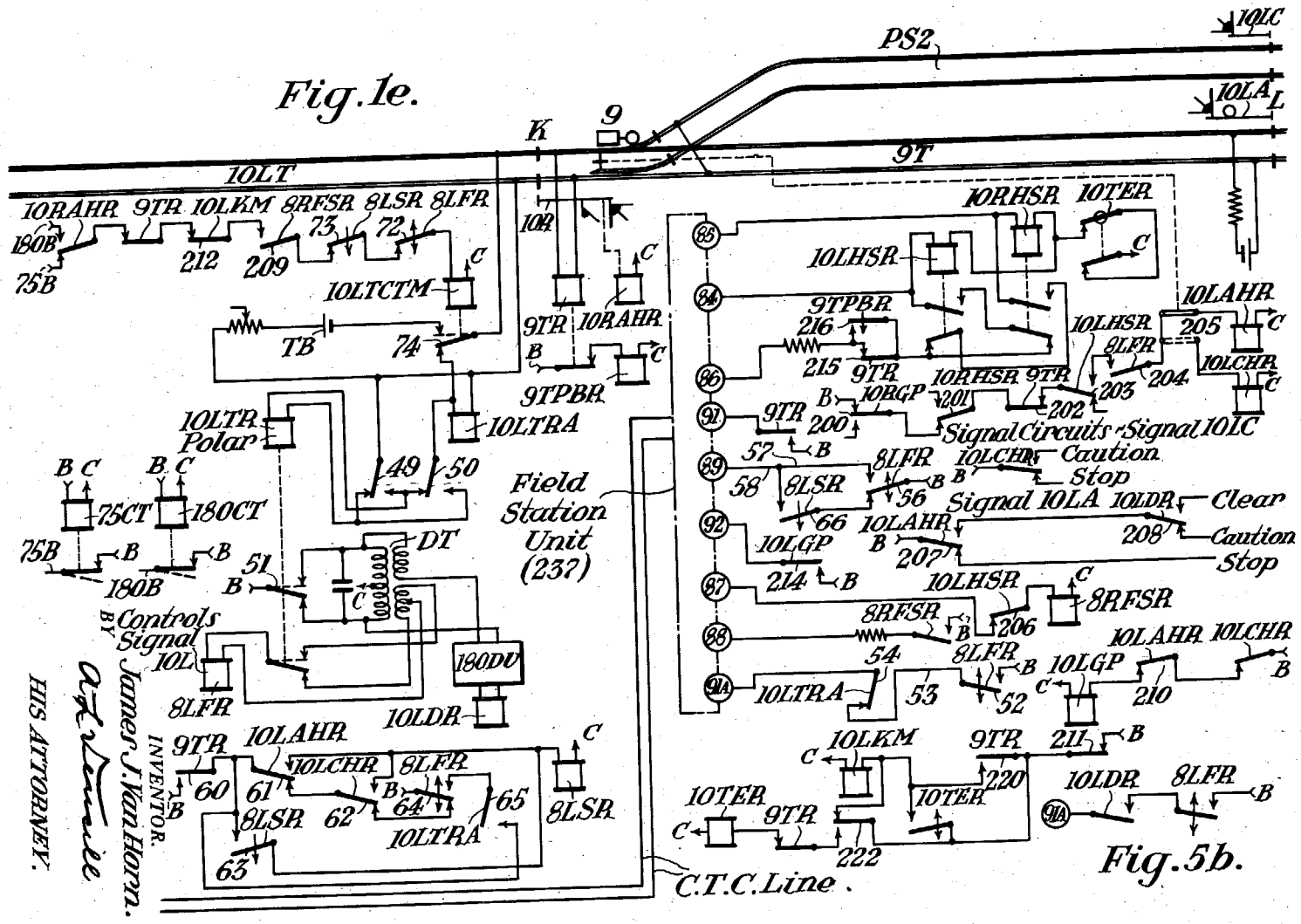

RAILWAY TRAFFIC CONTROLLING APPARATUS

Original Filed Sept. 12, 1941 12 Sheets-Sheet 6

INVENTOR.
James J. Van Horn.
BY
HIS ATTORNEY

RAILWAY TRAFFIC CONTROLLING APPARATUS
Original Filed Sept. 12, 1941 12 Sheets-Sheet 7
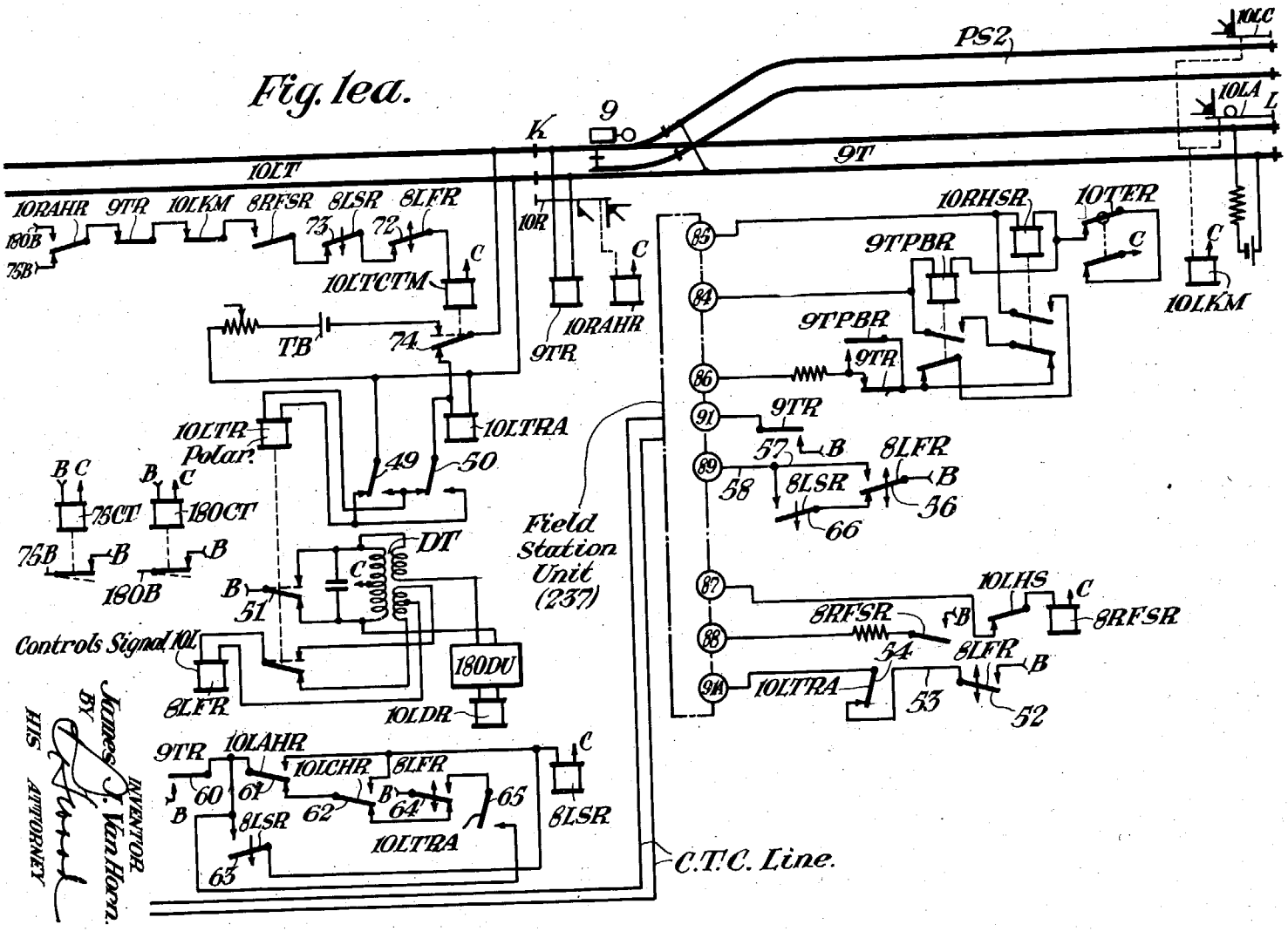

RAILWAY TRAFFIC CONTROLLING APPARATUS

Original Filed Sept. 12, 1941 12 Sheets-Sheet 8

INVENTOR
James J. Van Horn.
By
HIS ATTORNEY

RAILWAY TRAFFIC CONTROLLING APPARATUS
Original Filed Sept. 12, 1941 12 Sheets-Sheet 9
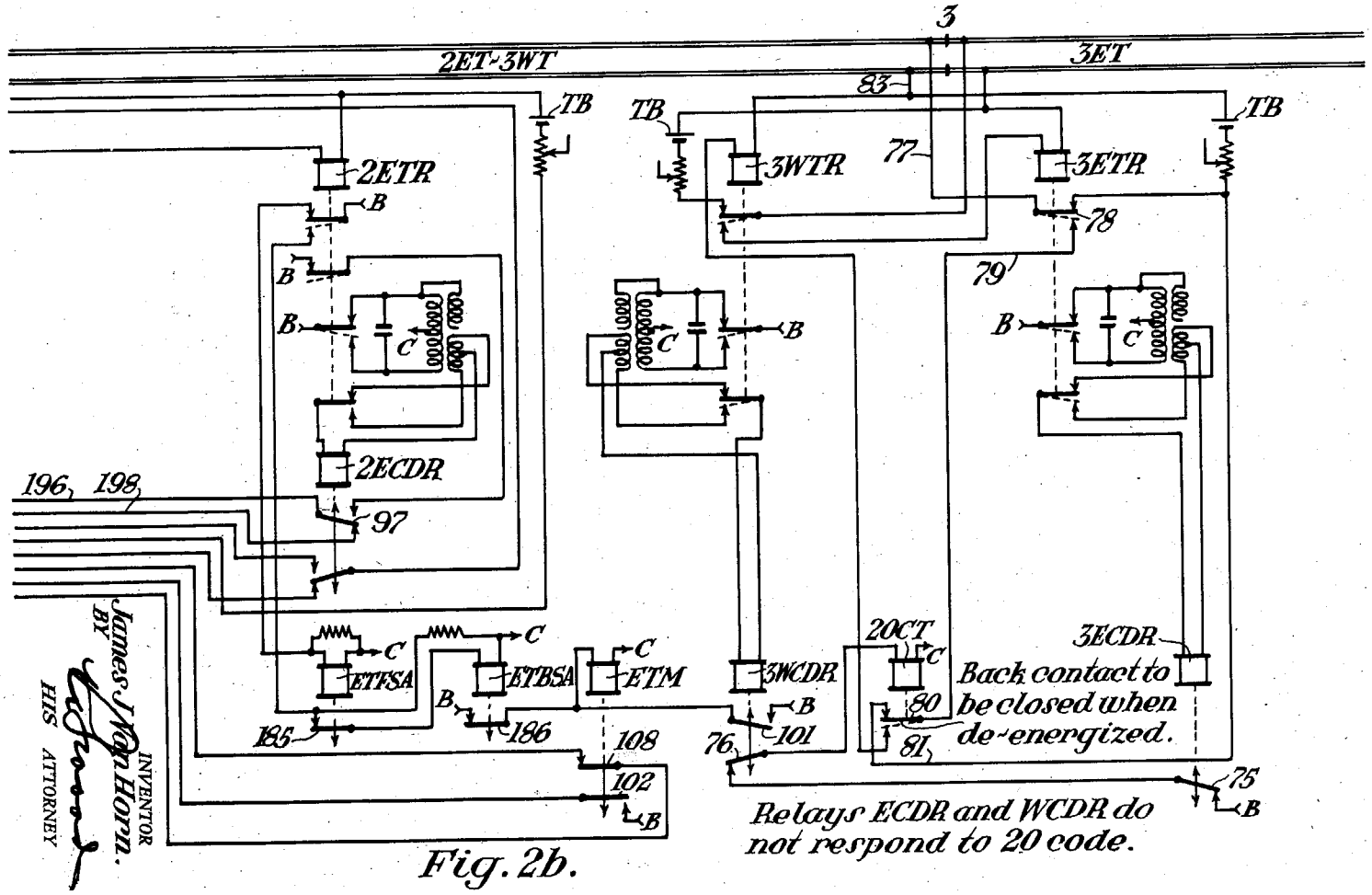

RAILWAY TRAFFIC CONTROLLING APPARATUS
Original Filed Sept. 12, 1941 12 Sheets-Sheet 10
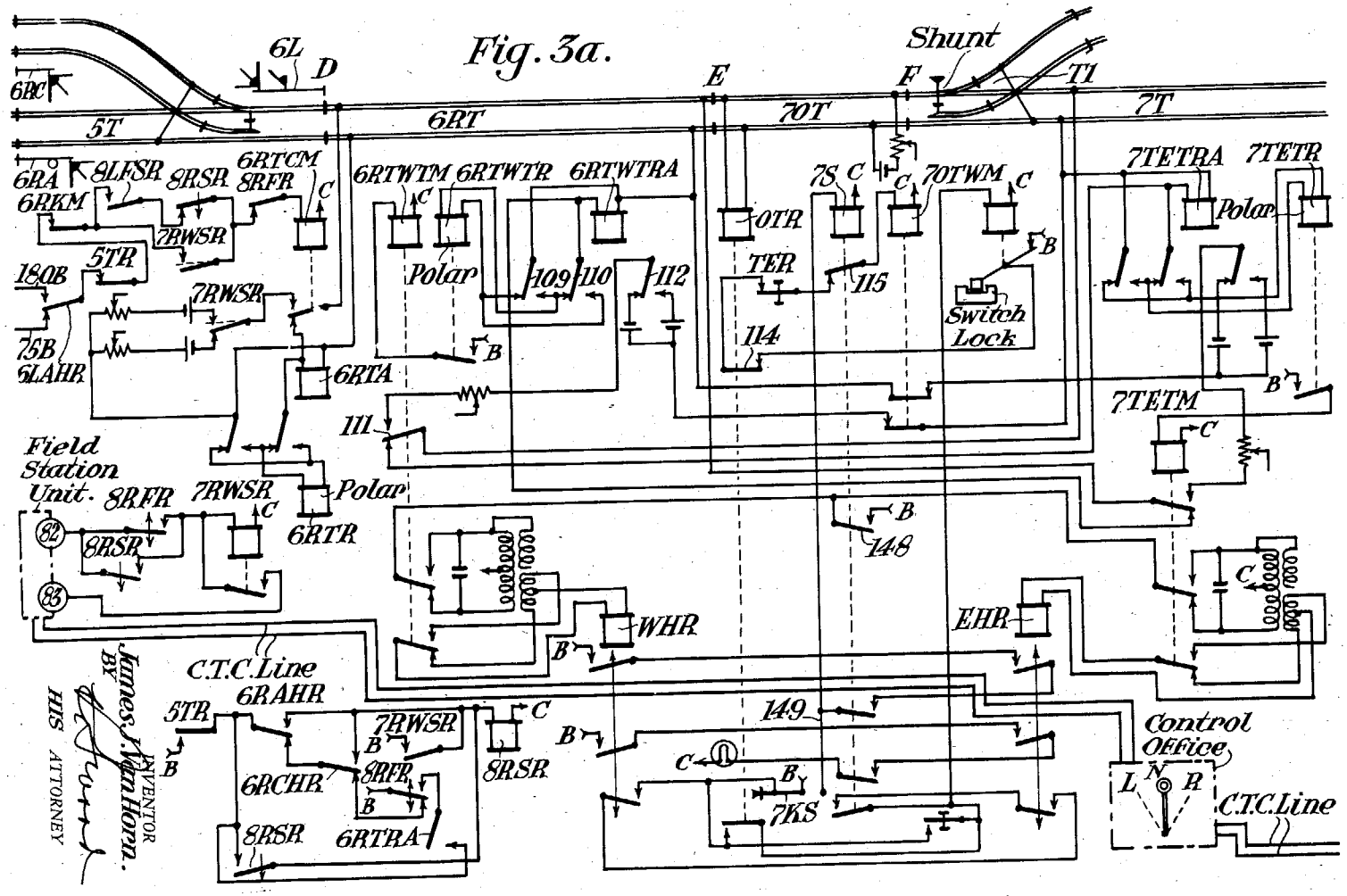

Sept. 16, 1947. J. J. VAN HORN Re. 22,915
RAILWAY TRAFFIC CONTROLLING APPARATUS
Original Filed Sept. 12, 1941 12 Sheets-Sheet 11
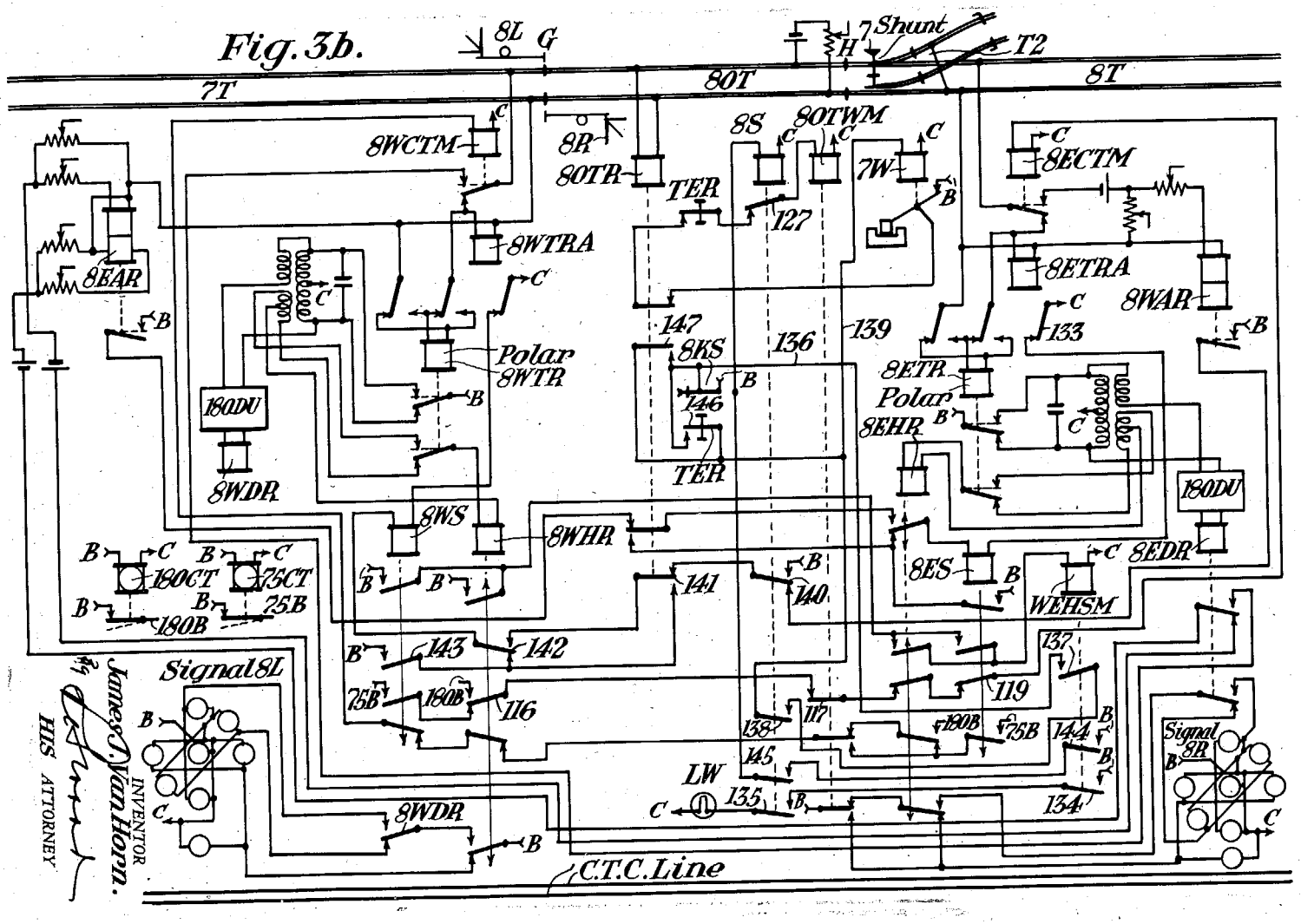

RAILWAY TRAFFIC CONTROLLING APPARATUS
Original Filed Sept. 12, 1941 12 Sheets-Sheet 12
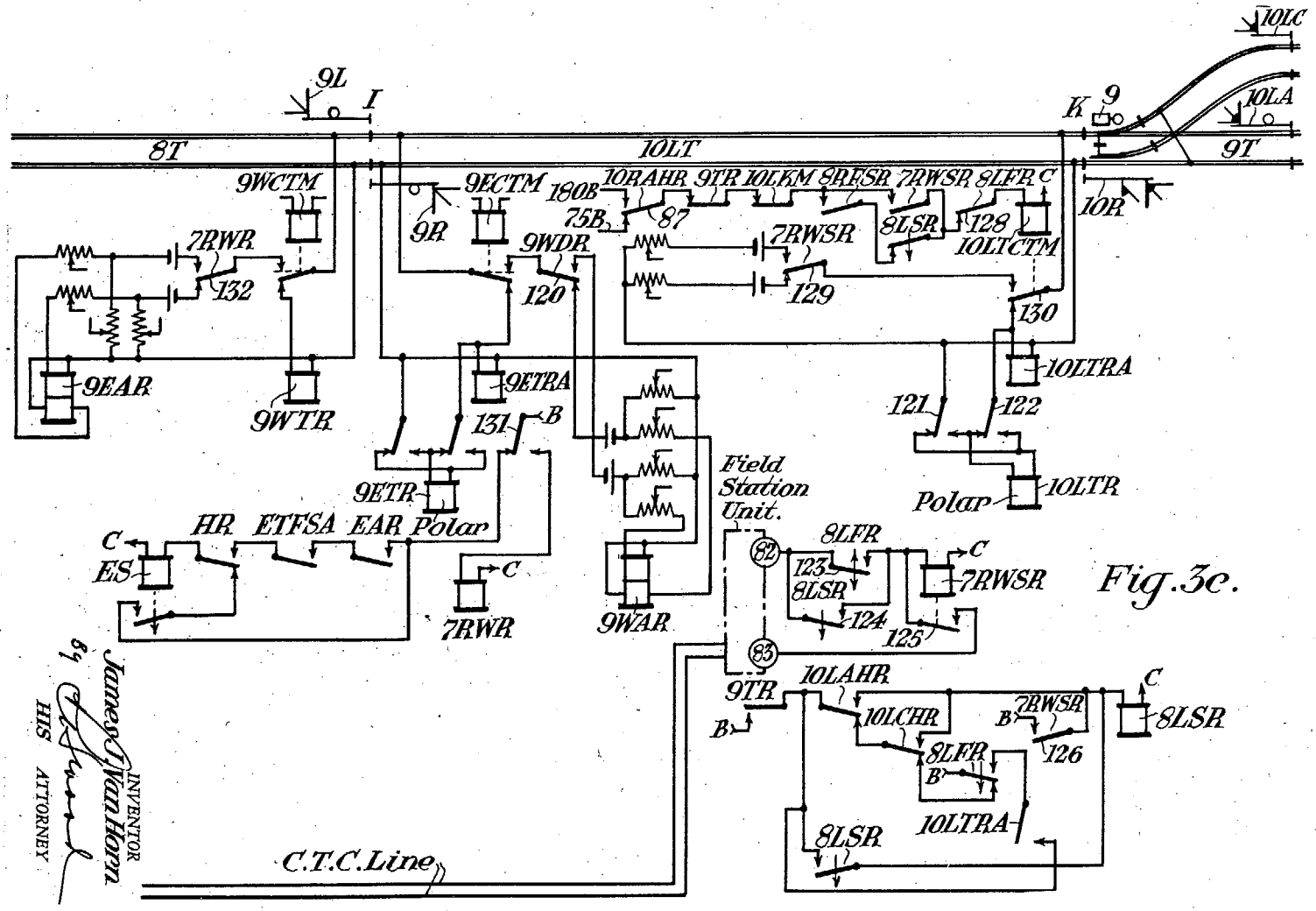

Reissued Sept. 16, 1947

Re. 22,915

UNITED STATES PATENT OFFICE 22,915

RAILWAY TRAFFIC CONTROLLING APPARATUS

James J. Van Horn, Pittsburgh, Pa., assignor to The Union Switch & Signal Company, Swissvale, Pa., a corporation of Pennsylvania Original No. 2,344,573, dated March 21, 1944, Serial No. 410,504, September 12, 1941. Application for reissue January 11, 1945, Serial No. 572,291

40 Claims. (Cl. 246—3)

Figure 1D:
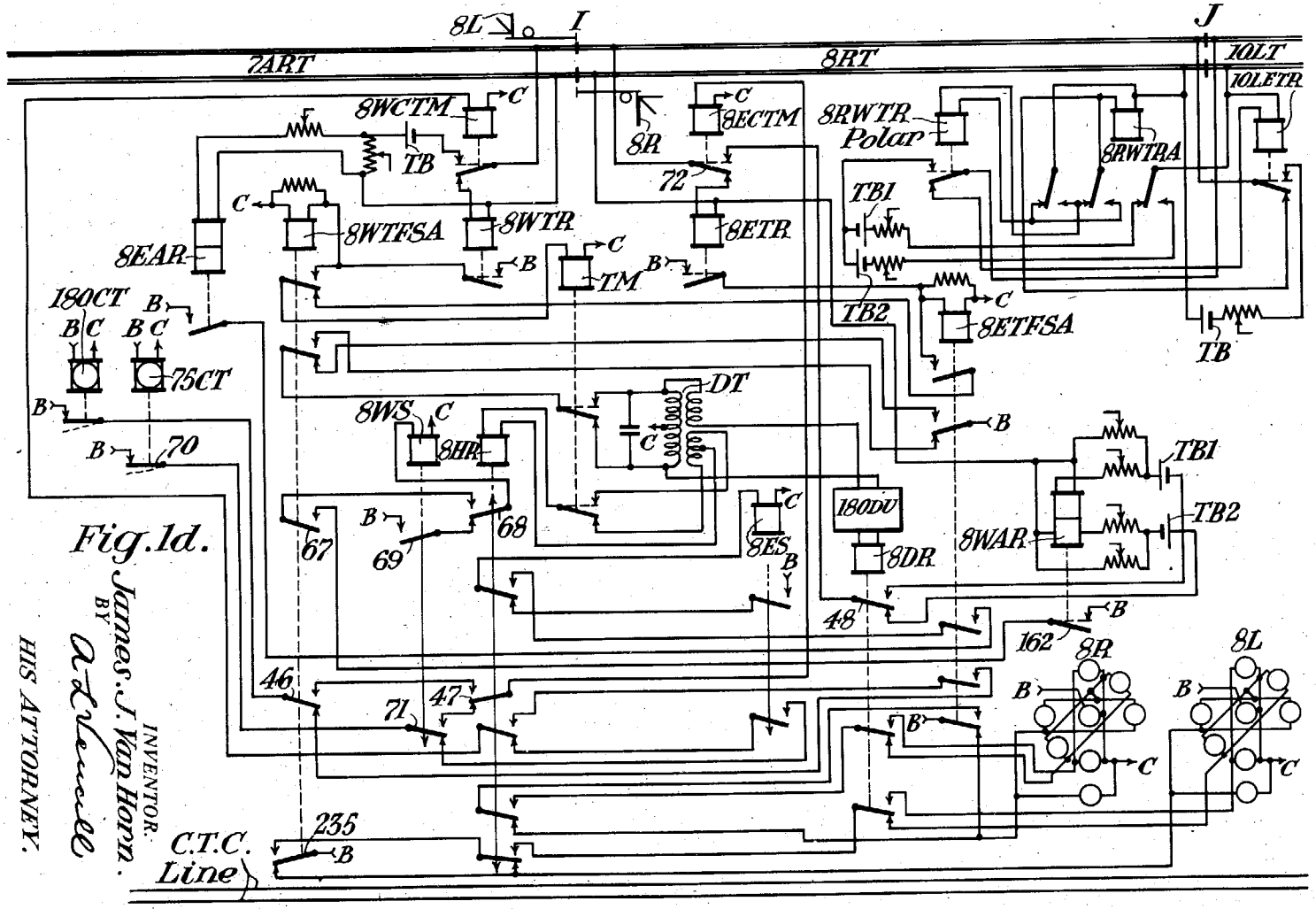

My invention relates to railway traffic controlling apparatus and is directed more particularly to the control of traffic in a single track two-direction system wherein centralized traffic control or other suitable manual control is used for establishing the traffic direction. A distinguishing feature of my system is that it employs normally deenergized track circuits and dispenses with all control line wires except the coded C. T. C. line circuit, if C. T. C. control is used.

One object of my invention is to provide a normally deenergized track circuit system of signaling for traffic moving in either direction on a single track, without employing the usual control line wires. Another object of my invention is to establish the desired traffic direction by means at the control office, the checking and safety features of the system being brought into play automatically as a result of operation of such means. A further object of my invention is to provide certain inter-controls on the C. T. C. machine, if used, to prevent interference with the established traffic direction when an entrance signal is at proceed or the section is occupied by a train. A still further object of my invention is to provide for the proper control of highway crossing signals and electric switch locks in a normally de-energized, non-line-wire system of the character herein disclosed. An additional object of my invention is to use but one set of code responsive apparatus for controlling both signals at intermediate locations. A further object of my invention is to provide a block indication for certain track circuits by polarizing the code effective therein. Other objects, purposes, and characteristic features of my invention will be apparent from the description which follows.

I accomplish the foregoing objects by: applying a rail current code at the new exit end of the stretch and cascading this code progressively over the track circuit sections to the new entrance end to thereby check unoccupancy of the stretch and obtain proper restrictive indications of the opposing signals as well as permissive indications of the signals for the new direction; using properly controlled stick repeater relays of the traffic lever or other traffic designating means in the control machine to prevent interference with the established traffic direction and to permit following moves; using the code checking relay (FSA) for directional control when the stretch is unoccupied and using the eastbound stick relay (ES) and the westbound stick relay (WS) for this directional control when the stretch is occupied; using the approach relay (AR) for the control of the directional stick relays (ES and WS); employing an additional rail current of a "slow" code for highway crossing control purposes in conjunction with the normally deenergized track circuits of my invention; and employing polarized coded track circuits for switch lock control without line wires, and feeding coded energy from both ends of the section toward the electric switch lock to indicate that the track sections on each side of the lock are unoccupied and that, if occupied, the train is moving away from the lock.

The present invention is an improvement on the invention disclosed in the United States patent application Serial No. 403,502 filed on July 22, 1941, by Ralph R. Kemmerer for Railway traffic controlling apparatus, now Patent No. 2,316,961 issued April 20, 1943.

I shall describe several forms of apparatus embodying my invention, and shall then point out the novel features thereof in claims.

Figure 1B:
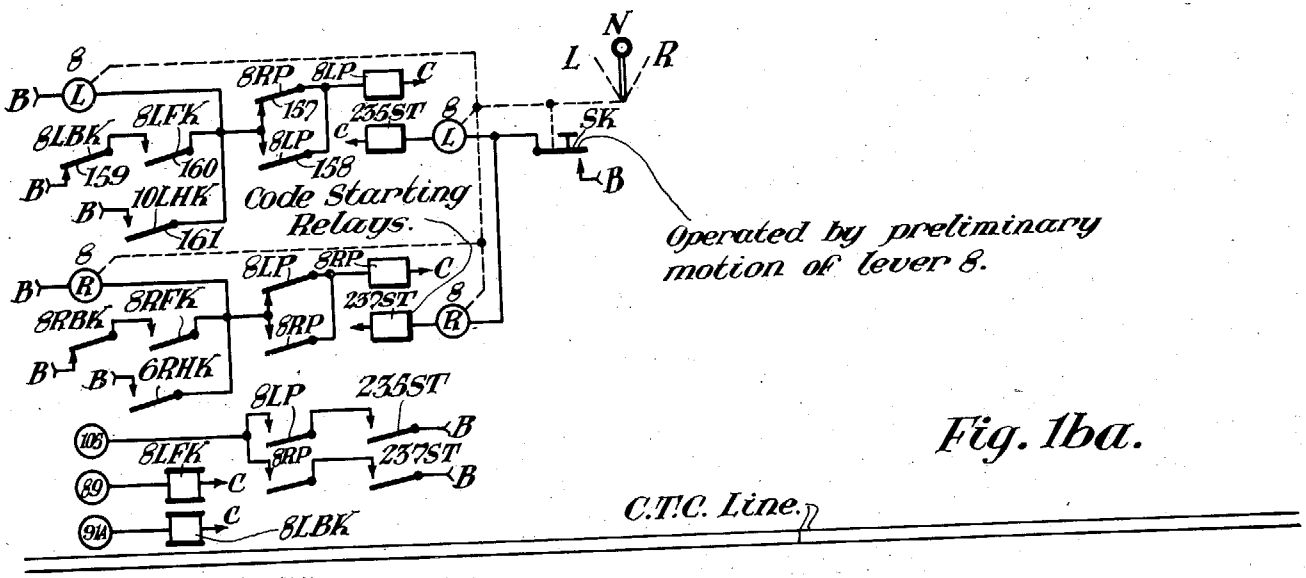
Figure 2A:
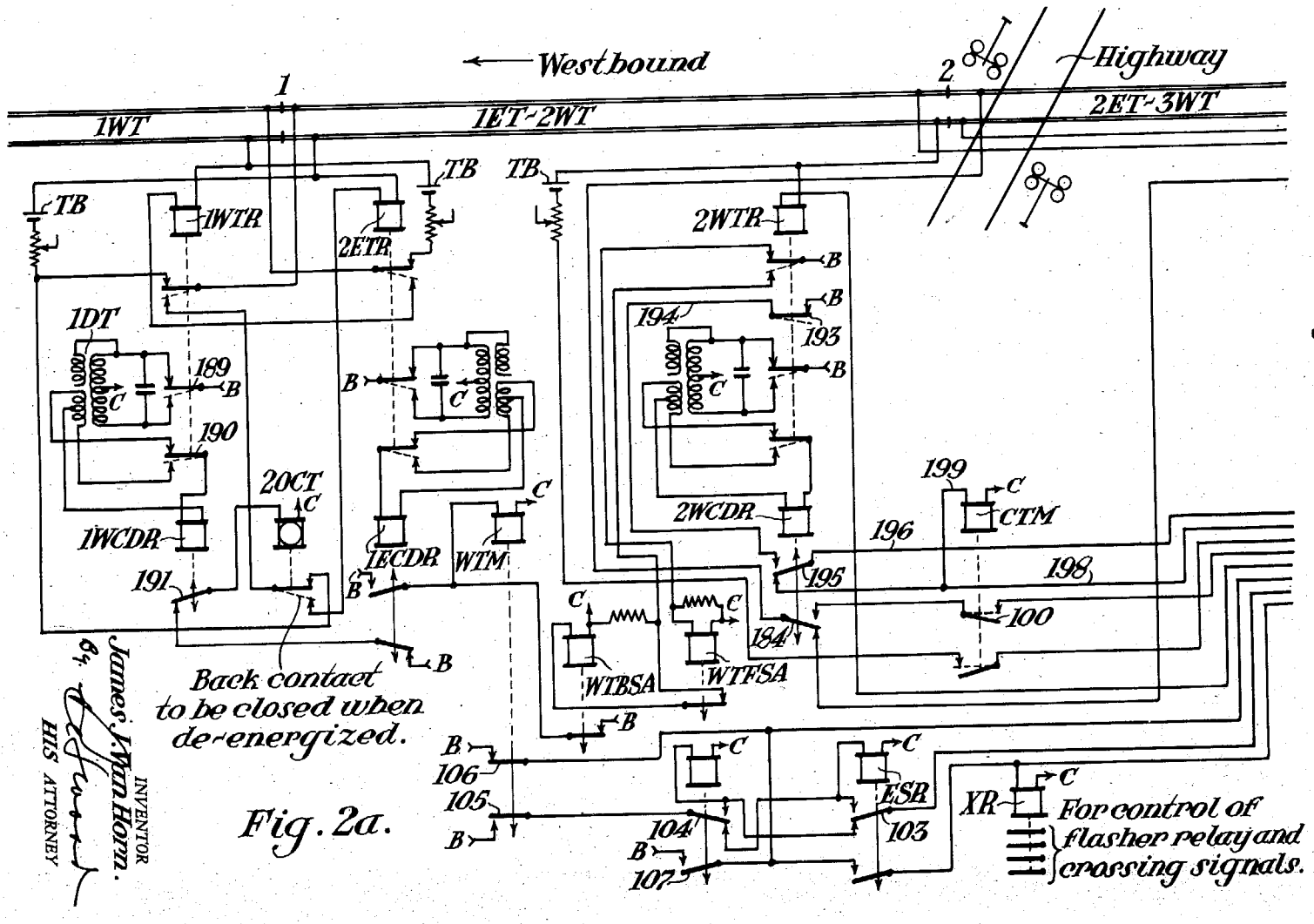

In the accompanying drawings, Figs. 1*a* to 1*e* taken together, with Fig. 1*a* at the left, are a diagrammatic view showing one embodiment of my invention as applied to a stretch of single track railway extending between the passing sidings at the two ends of the stretch. Figs. 1*ba* and 1*ea* are diagrammatic views showing Figs. 1*b* and 1*e* before amendment. Figs. 2*a* and 2*b* taken together, with Fig. 2*a* at the left, are a diagrammatic view showing my invention applied to a highway crossing location within a stretch of single track such as shown in Fig. 1. Figs. 3*a*, 3*b*, and 3*c* taken together, with Fig. 3*a* at the left, are a diagrammatic view showing my invention applied to the control of electric switch locks associated with the single track stretch. Fig. 4 shows a modified form of a portion of the apparatus of Fig. 3, also embodying my invention. Fig. 4*a* is an explanatory track diagram for Fig. 4. Figs. 5*a* and 5*b* are modified forms of certain portions of the apparatus shown in Figs. 1*a* and 1*e*, respectively, and also embodying my invention.

Similar reference characters refer to similar parts in each of the several views.

The circuits and apparatus shown in the accompanying drawings, but not shown in the drawings of the original patent, illustrate one form of subject matter described and claimed broadly in the original patent, and this applicant does not assert any claim to novelty in the specific arrangement of apparatus shown except insofar as claimed in the original patent.

Referring first to Figs. 1*a* to 1*e*, inclusive, the stretch of track between the passing sidings PS1 and PS2 is divided by the usual insulated rail joints at locations E, F, G, H, I, J, and K, to form a number of track circuit sections. Each of these track sections is identified by the reference character T with a distinguishing prefix which also identifies the apparatus associated with that section or location. The signals which govern traffic movements through the single track stretch are the head-block signals 6R and 10L at the respective ends of the stretch and the intermediate signals 7 and 8 at locations G and I. The cut section locations F, H, and J could likewise be provided with signals, if desired, by adding similar apparatus to that shown at the intermediate signal locations.

Each section of the single track stretch is, in reality, provided with two track circuits, one eastbound and one westbound, each of which includes a code following track relay TR at one end and a source of direct current track circuit energy, conveniently shown as a battery, at the other end. This current is properly coded under the influence of traffic conditions, or as initiated by the operator at the central control location shown diagrammatically as the control office in Fig. 1*a*. Depending upon the direction of traffic movement, only one or the other track circuit is effective at any one time as will become clear hereinafter. The control relays involved in an eastbound move generally carry the prefix E or R (for right-hand) and those which control westbound moves include the prefix W or L (for left-hand) in order to make the disclosure more readily understandable.

For simplicity, I make use of but two codes, these comprising direct current periodically interrupted at the rate of 75 times per minute for "approach" and 180 times per minute for "clear" signal indications. The coding is accomplished by means of suitable code transmitters 75CT and 180CT which are well known. It is understood that for cab signaling purposes, alternating current coded over the contacts of these code transmitters could be superimposed on the direct current track circuits but I have not shown this added complication since it does not involve my invention. Certain of the track circuits are polarized and employ polarized track relays as a means for providing an indication by means of a block light on the track model as to the location of a train within the single track stretch. This feature will be described more fully hereinafter. Directional stick relays are used for permitting following moves to be made without any further action being required on the part of the operator.

The relays 8LFSR (Fig. 1*a*) and 8RFSR (Fig. 1*e*) adjacent the two ends of the stretch are manually controlled traffic direction selecting relays which govern the direction of traffic movement through the stretch. The communication system by means of which the operator at the C. T. C. machine or control office may govern these relays may be of any suitable type, but preferably it is of the selective or code type in which communication is established intermittently by means of impulse codes transmitted over a single pair of line wires to the desired control location or field station. The details of such a communication system do not enter actively into the present invention and it is deemed sufficient for an understanding of the present invention to point out that the traffic direction from right to left or westbound is established by moving the lever 8 in the control office (Fig. 1*a*) to the left-hand or L position so as to energize the traffic relay 8LFSR at the field station at the left-hand end of the stretch (location E), and that the traffic direction from left to right or eastbound is established by moving the lever 8 to the right-hand or R position so as to energize the traffic relay 8RFSR at the other end of the stretch (location K). It is understood that the communication system is also used to provide an indication of traffic and apparatus conditions within the stretch, as well as to prevent interference with the established traffic direction except under proper conditions as will be pointed out hereinafter. It may also be used to govern the traffic leaving the single track stretch at either end by controlling the signals and switches at such ends. One form of communication system suitable for use in my system is that shown in Letters Patent of the United States No. 2,229,249 granted to L. V. Lewis on January 21, 1941, for Remote control system, and the general designation of the relays comprising the C. T. C. portion of my system corresponds with that used in this patent. In order further to simplify the disclosure, I have used the same reference numbers as in the Lewis patent to designate corresponding terminals or wires of the field station code units at the two ends of the stretch, these wires serving to transmit analogous control or indication functions.

The C. T. C. equipment at the office includes a control machine having a panel on which is mounted a miniature diagram of the controlled track stretch together with the indication lamps and the traffic and signal levers as shown in Fig. 1*a*.

The signal levers 6SIG and 10SIG are three-position levers of usual construction, and the traffic lever 8 is of the three-position push-turn type such as is shown in Letters Patent of the United States No. 2,289,736, granted July 14, 1942 to Clarence S. Snavely and Regis H. Zetwo for Circuit controllers.

It is to be understood that an installation may be made up of a number of unit portions generally similar to the one shown in the drawings, but, as the invention may be fully understood from one such portion, only one has been illustrated in the drawings.

I shall now describe the operation of the apparatus of my invention in detail, first assuming that all of the track apparatus (except the code transmitters) is deenergized, and that the operator moves the traffic lever 8 to its left-hand or L position.

The contact SK (Fig. 1*b*) is closed during turning movement of the lever 8 and when the lever reaches its position L energy is supplied to the starting relay 235ST to pick up the contacts of this relay before the operator's hand is removed from the lever and contact SK opens. When relay 235 ST picks up, it establishes a stick circuit for itself to keep its contacts picked up until a control code is sent to the associated field station, as explained in the above-identified patent to L. V. Lewis.

In addition, on movement of lever 8 to its position L energy is supplied over back contact 157 of relay 8RP to relay 8LP and its contacts pick up with the result that energy is supplied to a terminal 87 over front contact 13 of relay 8LP when contact 14 of selector relay 235S is picked up.

As explained in the Lewis patent referred to above, each control code includes a distinctive code call by means of which a selector relay 235S or 237S, not shown, at the office and a similar relay, not shown, at one field station only is energized to effect temporary establishment of seven communication channels between the office and a station. The different stations have different code calls, consequently, the selector relays for different stations are not energized at the same time and the same channels provide communication at different times with all of the stations.

Accordingly, when the control code is transmitted to the field station 235 at the left-hand or west end of the single track stretch, contacts 13 and 14 of relays 8LP and 235S are closed and energy is supplied to terminal 87 at the office so that the field station equipment causes energy to be supplied from the corresponding terminal over back contact 16 of relay 6RHSR to relay 8LFSR and its contacts pick up, while the relay establishes a stick circuit for itself through terminal 88 of the field station unit to keep the relay contacts picked up until, as explained in the Lewis patent, a control code is sent to this field station at a time when energy is not supplied to terminal 87 at the office.

The energization of relay 8LFSR completes a circuit which energizes the code repeating relay 6RTCTM on code to thereby transmit a corresponding code to the track section 6RT. If the home relay 6LAHR for signal 6LA is deenergized, so that back contact 23 is closed, as shown, 75 code will be transmitted to condition signal 7L at location G to display an approach indication. If, however, signal 6LA is at approach or clear, then relay 6LAHR will be energized so that 180 code will be supplied over contact 23, now closed in its up position. As shown, signal 6LA is at stop so that the coding circuit for relay 6RTCTM may be traced from the code transmitter wire 75B which is one terminal of the 75 code source, back contact 23 of relay 6LAHR, front contacts 24, 25, and 26 of relays 5TR, 6RKM, and 8LFSR (now up), back contacts 27 and 28 of relays 8RSR and 8RFR, and the winding of relay 6RTCTM, to the other terminal C of the source. Contact 24 of relay 5TR checks that an eastbound move has not been started past signal 6R, and contact 25 of relay 6RKM checks that the opposing signals 6RA and 6RC are at stop. The relay 6RKM is controlled in substantially the same manner as the relay 10LKM at the opposite end of the stretch. Since relay 6LAHR is well known, the specific control circuits for this relay is not shown in detail, it being sufficient to associate the relay with signal 6LA. Back contacts 27 and 28 of relays 8RSR and 8RFR, respectively, check that traffic has not been established for an eastbound move, as will be apparent hereinafter. Accordingly, with the apparatus in the condition illustrated, 75 code is being supplied to the section 6RT from the track battery TB over the front point of coding contact 29 of relay 6RTCTM.

The 75 code is received at location F by the westbound code following track relay 6RWTR, over the back point of contact 30 of the eastbound track relay 6RETR, and is relayed into the cut section 6ART over the coding contact 31 of relay 6RWTR. This contact supplies a current impulse from the track battery TB over an obvious circuit each time that its front point closes. The 75 code is received by relay 7WTR at location G, over the back point of contact 32 of relay 7WCTM which results in the energization of relay 7WTFSA which is slow acting by virtue of the resistor snub 33 and therefore retains its picked-up position while relay 7WTR is coding. The energization of relay 7WTFSA closes an obvious circuit over its front contact 35 and front contact 34 of relay 7WTR for the code repeater relay TM which follows the code and controls a set of decoding apparatus common to both sections 6ART and 7RT. Relay TM itself is also common to both these sections and when traffic is eastbound, this relay is picked up over front contacts of the corresponding eastbound relays 7ETR and 7ETFSA and the back point of contact 35 of relay 7WTFSA.

When relay 7WFSA picks up, its contact 230 interrupts one circuit for lighting the marker and stop indication lamps of signal 7L and establishes the circuit controlled by contact 231 of relay 7HR and by contact 232 of relay 7DR for causing the signal 7L, when relay 7RH is picked up, to display either its caution or its clear indication according as relay 7DR is released or picked up.

Relay TM will follow the code supplied by the 7WTR relay (which in this case is 75 code) and in so doing will energize the slow pick-up, slow release relay 7HR from the decoding transformer 7DT over the rectifying contact 36 of relay TM in the usual and well-known manner. The transformer 7DT is energized over the coding contact 37 of relay TM and this circuit also includes the front point of contact 38 of relay 7WTFSA and the back point of contact 39 of relay 7ETFSA. Should relay TM be following the 180 code instead of 75, then the decoding relay 7DR which responds selectively to 180 code only, because of the presence of the resonant decoding unit 180DU, will be energized in addition to relay 7HR. Since relays 7WTFSA and 7HR are both energized, a 180 code circuit is completed for the code following relay 7RECTM over the coding contact 40 of code transmitter 180CT and front points of contacts 41 and 42 of relays 7WTFSA and 7HR, respectively, whereupon relay 7RECTM will supply 180 code from battery TB over the front point of its coding contact 43 to the section 7RT.

A portion of the energy supplied from battery TB to the rails of section 7RT is supplied over a circuit including in series therewith a winding of the code following approach relay 7WAR. As explained in Letters Patent of the United States No. 2,176,605 issued October 17, 1939, to Herman G. Blosser, the various parts of the equipment are arranged and proportioned so that when section 7RT is not occupied too little energy is supplied through the winding of relay 7WAR to pick up the relay contact 162 so that it remains released and interrupts the pick-up circuit of relay 7WS. The various parts of the equipment are also arranged and proportioned so that when a westbound train advances a predetermined distance in section 7RT the shunting effect of the train increases the energy supplied through the relay 7WAR sufficiently to cause contact 162 of relay 7WAR to be picked up each time an impulse of coded energy is supplied to the rails of section 7RT.

At the cut section location H, the 180 code will be received by relay 7RWTR and re-transmitted or cascaded into section 7ART over the front point of coding contact 44 of this relay. This code will be received at signal location I in the same manner as described for the signal location G so that this description need not be repeated. With relays 8WTFSA and 8HR both energized, relay 8ECTM will be energized on 180 code over the front points of contacts 45, 46, and 47, as at location G, and will repeat this code into section 8RT. From this section, the code will be repeated into section 10LT by polar relay 8RWTR (which is connected in parallel with the polarized track relay 8RWTRA), as hereinafter explained. Relays 10LTRA and 10LTR at location K will receive the 180 code and will make it possible for the operator to clear the headlock signal 10L so as to permit a westbound train to enter the single track stretch.

Referring again to location I, it will be noted that the code supplied to section 8RT is polarized and is of one polarity when the 180 code decoding relay 8DR is energized so that the front point of contact 48 is closed, but is of the other polarity when relay 8DR is deenergized and the back point of contact 48 is closed. Contact 48 selects either battery TB1 or TB2 as the supply battery for the track code and since these batteries are oppositely poled, polarized track circuit operation is obtained. The reason for polarizing the block I—K is to provide a proper block indication on the track model, which feature will be described more fully hereinafter. For the present, it will be sufficient to state that the code following biased polar track relay 10LTRA at location K is energized in parallel with the non-biased polarized code following relay 10LTRA and is checked over the polar contacts 49 and 50 of the latter relay, as explained in Letters Patent of the United States No. 2,250,214, issued July 22, 1941, to Harry E. Ashworth, to insure that the latter has responded properly to the polarized track circuit code. The track relays of my system such as 6RWTR, 7WTR, 7RWTR, etc., are preferably of the biased polar type which means that these relays will respond only to current of the proper polarity. Current of the other polarity will merely hold the contacts of these relays more strongly in their released position. The non-biased polarized track relays such as 8RWTRA and 10LTRA respond selectively to current of either polarity and their contacts remain in the position to which they were last operated.

The energy supplied from batteries TB1 and TB2 to the rails of section 8RT is supplied over circuits each of which includes in series therewith a winding of approach relay 8WAR which functions in the manner explained in detail above in connection with relay 7WAR. The relay 8WAR is of the biased polar type the contact of which picks up only when energy flows through the relay windings in a selected direction. The circuits of the relay windings and of the batteries TB1 and TB2 are arranged so that the energy supplied from each of the batteries flows through the relay winding in the proper direction to pick up the relay contact.

Returning again to location K, the coding action of relay 10LTR will energize the decoding transformer DT at 180 code over the coding contact 51 so that both relays 10LDR and 8LFR will become energized. Relay 8LFR is the usual code detecting relay which remains energized on impulses of either 75 or 180 code. With relay 8LFR energized and polarized relay 10LTRA occupying its normal position as shown, a circuit will be completed to terminal 91A of the field station unit over front contact 52 of relay 8LFR, wire 53, and the normal polar contact 54 of relay 10LTRA, so as to provide the operator with an unoccupied westbound block indication on the track model. The energization of relay 8LFR also closes a circuit to terminal 89 of the field station unit over the front point of its contact 56 and wires 57 and 58 to provide an indication at the control office that traffic is established for a westbound move.

As explained in the above-identified patent to L. V. Lewis, the equipment at each field station includes a starting relay, not shown, which is energized and initiates transmission of an indication code from that field station to the office, whenever there is a change in the position of any of the indicating relays which govern energization of the indication channels and also in response to a received control code even if no such change occurs. Each code initiated at a field station causes indication codes to be transmitted to the office to cause indication relays governed from this station to assume energized or released positions in accordance with the condition of energization of the indication channels at the field station.

Accordingly, the indication code sent from station 237 to the office after the supply of energy to terminals 89 and 91A of this field station unit picks up relays 8LFK and 8LBK (Fig. 1b) and they establish stick circuits for themselves so that they remain picked up until an indication code is sent from the field station 237 to the office at a time when energy is not supplied to terminals 89 and 91A of the field station.

When relay 8LFK picks up, a circuit is established for the westbound direction designating lamp as shown in Fig. 1a of the drawings, and, when relay 8LBK picks up, a circuit is established for the westbound block lamp. Illumination of these lamps informs the operator that the wayside equipment has prepared the stretch for westbound traffic and that the block is unoccupied.

In addition when relay 8LFK picks up, its contact 160 (Fig. 1b) prepares a stick circuit for relay 8LP to prevent release of relay 8LP when relay 8LBK is released, that is, when the stretch is occupied.

The operator may now clear one of the signals 10LA or 10LC, depending on the position of the switch 9, to permit a westbound train to enter the stretch. In order to clear one of these signals the signal lever 10SIG, Fig. 1a, is moved to its left-hand position so that when selector relay 237S picks up energy is supplied to terminal 84 at the office. The starting button, not shown, for this station may now be pressed to cause a control code to be sent to station 237 at the right-hand or east end of the stretch with the result that energy is supplied through terminal 84 of the field station unit to relay 10LHSR and its contacts pick up to establish for the relay a stick circuit governed by relay 10RHSR, track relay 9TR and its slow release repeater relay 9TPBR.

When relay 10LHSR picks up, its contact 206 interrupts the circuit of relay 8RFSR to insure that it remains released so that its contact 209 interrupts the circuit of code transmitting relay 10LTCTM and thus prevents supply of coded energy to the east end of the stretch after relay 10LHSR has been picked up to clear the westbound signal.

When relay 10LHSR picks up, energy may be supplied over front contact 203 of relay 10LHSR, front contact 204 of relay 8LFR, and contact 205 to relay 10LAHR or 10LCHR. The contact 205 is governed in accordance with the position of switch 9 so as to establish the circuit of relay 10LAHR when and only when the switch is in its normal position and to establish the circuit of relay 10LCHR when and only when the switch is in its reverse position. As shown in the drawings the switch 9 is in its normal position so contact 205 establishes the circuit of relay 10LAHR, and its contact 207 interrupts the circuit governing the stop indication of signal 10LA and establishes the circuit for causing this signal to display its caution or its clear indication according as contact 208 of relay 10LDR is released or picked up.

In addition, when relay 10LAHR picks up, its contact 210 interrupts the circuit of relay 10LGP and its contacts release so that contact 211 interrupts the circuit of relay 10LKM and it releases to interrupt its stick circuit and its contact 212 interrupts the circuit of code transmitting relay 10LTCTM to prevent supply of coded energy to the east end of the stretch after clearing of the signal authorizing entrance of a westbound train into the stretch.

In addition, on release of relay 10LKM, its contact 222 permits energy to be supplied to time element relay 10TER and thus permit relay 10LKM to be picked up after a time interval in the event that signal 10LA or 10LB is put to stop manually.

On release of relay 10LGP its contact 214 connects the battery to terminal 92 of the C. T. C. system field station unit and an indication code is sent to the office to pick up relay 10LHK, Fig. 1*b*, which may light a lamp, not shown, on the control panel, Fig. 1*a*, while contact 161 of relay 10LHK establishes a stick circuit for relay 8LP, Fig. 1*b*, to insure that there will be no interference with the established direction of traffic in the stretch after clearing of the signal governing entrance of westbound traffic into the stretch.

In the preceding description it has been assumed that the control code to pick up relay 10LHSR and clear signal 10LA was not transmitted until the track circuit apparatus had prepared the stretch for westbound traffic and indications thereof had been transmitted to the office. However, this sequence of operations is not essential and the code to pick up relay 10LHSR may be sent before the track circuit apparatus completes preparation of the stretch for westbound traffic so that the signal will clear as soon as the wayside equipment shows that this is proper and the signal clear and block indication codes will be transmitted to the office at the same time.

If the single track stretch should include but one intermediate signal location (G), then the westbound block indication can be provided, as shown in Fig. 5*b* (Sh. 5), over a front contact of relay 8LFR and a front contact of the 180 code detecting relay 10LDR. The eastbound block indication under this condition will similarly be provided, as shown in Fig. 5*a* (Sh. 1), over a front contact of relay 8RFR and the 180 code detecting relay 6RDR. In this arrangement, it is unnecessary to polarize the code in order to obtain a continuous block indication.

Having described the manner in which the apparatus is conditioned for a traffic movement in the westbound direction over the stretch, I shall next trace the progress of a west bound train as it moves over the various sections.

When the train enters section 9T, the track relay 9TR releases and interrupts the circuit of relay 9TPBR but relay 9TPBR is of a type the contacts of which are slow to release so they remain picked up for a substantial period subsequent to release of relay 9TR. On release of relay 9TR its contact 215 interrupts the stick circuit of relay 10LHSR and this relay releases to additionally interrupt the relay stick circuit. After a short time interval relay 9TPBR releases and its contact 216 shunts contact 215 of relay 9TR in the circuit of relay 10LHSR to permit relay 10LHSR to be picked up during occupancy of section 9T to clear a westbound signal for a following train.

On release of relay 10LHSR its contact 203 interrupts the circuit of relay 10LAHR and this relay releases so that its contact 207 interrupts the caution and clear control circuits of signal 10LA and establishes the stop control circuit for this signal.

On release of relay 10LAHR its contact 210 completes the circuit of relay 10LGP and its contacts pick up so that contact 214 interrupts the connection to terminal 92 of the C. T. C. system field station unit with the result that subsequent indication codes sent to the office will report signals 10L at stop and release relay 10LHK.

When relay 10LGP picks up, energy is supplied over its front contact 211 and back contact 220 of relay 9TR to relay 10LKM and its contacts pick up so that contact 222 establishes a stick circuit for the relay to keep it energized after section 9T is vacated and relay 9TR picks up.

When relay 10LKM picks up, its front contact 212 in the circuit of relay 10LTCTM is closed but at this time the circuit of relay 10LTCTM is interrupted by a contact of relay 9TR or by contact 73 of relay 8LSR as explained below.

As the train enters section 9T, relay 9TR will release and a circuit will be completed for the directional stick relay 8LSR over the back contact 60 of relay 9TR and the front point of contact 61 of relay 10LAHR which is the home relay for signal 10LA. If the train enters from the siding PS2, then the circuit for relay 8LSR will include the back point of contact 61 and the front point of contact 62 of the corresponding home relay 10LCHR for signal 10LC. Once relay 8LSR picks up, it closes a stick circuit for itself over back contact 60 of relay 9TR and its own front contact 63. When the train enters section 10LT, the code detecting relay 8LFR will release, closing an auxiliary stick circuit for relay 8LSR over back contact 64 of relay 8LFR, back points of contacts 62 and 61 of relays 10LCHR and 10LAHR, and front contact 63 of relay 8LSR. This stick circuit does not include the back contact 60 of relay 9TR so that when the train fully clears section 9T and relay 9TR picks up, the directional stick feature provided by relay 8LSR will continue to be maintained. Furthermore, when the train fully clears sections 10LT and 8RT so that relay 8LFR picks up on 75 code, an additional stick circuit for relay 8LSR will become effective in order that this relay may remain energized during the whole time that the stretch is occupied. Consequently, the westbound traffic directional arrow on the track model will remain lighted. This additional stick circuit for relay 8LSR includes the front point of contact 64 of relay 8LFR, reverse polar contact 65 of relay 10LTRA, and front contact 63 of relay 8LSR. Reverse polar contact 65 will close before relay 8LFR picks up and will remain closed thereafter until the stretch is cleared, whereupon relay 8DR at location I will become energized and will restore normal polarity code to block I—K. Relay 10LTRA will then again become energized in the normal direction.

Referring to the C. T. C. system field station unit 237, Fig. 1e, it will be seen that when relay 8LFR is picked up energy is supplied over its front contact 56 to terminal 89 so that indication codes sent to the office from this station pick up relay 8LFK, Fig. 1b, to light the westbound traffic direction lamp on the control panel, Fig. 1a, to show that westbound traffic is established in the stretch. Energy is also supplied to terminal 89 of the C. T. C. system field station unit 237 when contact 56 of relay 8LFR is released provided contact 66 of relay 8LSR is picked up. As explained above the relay 8LSR is picked up as soon as a westbound train enters section 9T so that, when the train advances into section 10LT and causes relay 8LFR to release, the supply of energy to terminal 89 of the field station unit is maintained by contact 66 of relay 8LSR and indication codes sent to the office maintain relay 8LFK picked up and thus maintain the westbound directional lamp on the control panel lighted and to maintain the stick circuit for relay 8LP controlled by relay 8LBK so that relay 8LP will remain energized and maintain westbound traffic in the stretch during occupancy thereof.

Moreover, when section 10LT is vacated and relay 8LFR picks up, the supply of energy to terminal 89 of the field station unit is maintained so that the westbound traffic direction lamp on the control panel of the C. T. C. machine remains lighted. When the stretch is vacated, this light remains lighted until the operator sends a code to the west end of the stretch to release relay 8LFSR and cut off the supply of coded energy to the rails of the stretch and thereby release relay 8LFR while maintaining relay 8LSR released.

When the train advances into section 10LT and releases relay 8LFR its contact 204 additionally interrupts the circuit of relay 10LAHR to insure that this relay remains released and keeps signal 10LA at stop as long as section 10LT is occupied.

When relay 8LFR releases, its contact 52 interrupts the supply of energy to terminal 91A of the field station unit 237 and the indication codes sent to the office release relay 8LBK, Fig. 1b, so that it extinguishes the westbound block lamp on the panel of the control machine, Fig. 1a. Extinguishment of this lamp at a time when the westbound traffic direction lamp is lighted indicates to the operator that a westbound train has entered the stretch.

In addition, release of relay 8LBK at a time when relay 8LFK is picked up completes for relay 8LP the stick circuit including its own front contact 158, front contact 160 of relay 8LFK and back contact 159 of relay 8LBK to thereby prevent release of relay 8LP in the event lever 8 is moved away from its position L. Accordingly, after the stretch has been prepared for westbound traffic and a westbound train enters the stretch, the relay 8LP is certain to remain picked up so that its contact 13 maintains the supply of energy to terminal 87 to insure that control codes sent to field station 235 keep relay 8LFSR picked up to continue the supply of coded energy to the rails of the track stretch. This insures that the wayside equipment will maintain westbound traffic in the stretch after occupancy of the stretch and that the supply of coded energy to the exit end of the stretch cannot be discontinued with resultant display of stop indications by the signals at intermediate points in the track stretch in advance of the train in the stretch.

The westbound stick relay 8WS at location I is picked up over front contact 162 of the approach relay 8WAR and front contacts 67 and 68 of relays 8WTFSA and 8HR, respectively, when the train approaches the signal 8L. When once picked up, relay 8WS is retained energized during occupancy, over a stick circuit which includes its own front contact 69 and the back point of contact 68 of relay 8HR. This stick circuit does not become operative, however, until the train passes signal 8L and shunts the track section 7ART so as to release relay 8HR. With relay 8WS energized, relay 8ECTM will respond to 75 code over a circuit which includes the 75 code contact 70, front point of contact 71 of relay 8WS, and back point of contact 47 of relay 8HR. Relay 8ECTM will transmit 75 code of reverse polarity over the front point of its contact 72 to the section I—K and the receipt of this code at location K will permit signal 10LA or 10LC to provide an indication for a following move through the stretch.

When the train enters section 7ART the track relay 8WTR remains released so that energy is no longer supplied to relays 8WTFSA, TM, 8HR and 8DR and these relays release with the result that contact 235 of relay 8WTFSA interrupts the circuits for signal 8L governed by relays 8HR and 8DR and establishes a circuit to cause signal 8L to display its stop indication.

The energy of 75 code frequency and reverse polarity supplied over the rails of section 10LT when the train vacates section 8RT causes the contacts of relay 10LTRA to move to their right-hand or reverse position so that contact 54 interrupts the circuit leading to terminal 91A of the field station unit 237. The coded energy supplied over the section rails also operates relay 10LTR to pick up relay 8LFR so that its contact 56 establishes connection to terminal 89 of the field station 237. At this time contact 52 of relay 8LFR is also picked up but energy is not supplied to terminal 91A of the field station unit since contact 54 of relay 10LTRA is in its reverse position. Accordingly, indication codes sent to the office will maintain relay 8LFK picked up to light the westbound direction lamp but will keep relay 8LBK released to prevent lighting of the westbound block lamp, while relays 8LFK and 8LBK establish the stick circuit for relay 8LP and thus insure that westbound traffic will be maintained in the track stretch.

Also when relay 8LFR picks up, its contact 204 is closed to permit relay 10LAHR or 10LCHR to be energized if it is desired to authorize a following train to enter the stretch.

When the train advances in section 7RT within a predetermined distance of signal 7L, the relay 7WAR operates and establishes the pick-up circuit for relay 7WS so that it picks up and prepares its stick circuit which is completed when the train enters section 6ART and causes relay 7HR to release.

When the train advances into section 6ART, the track relay 7WTR remains released and energy is no longer supplied to relays 7WTFSA, TM, 7HR and 7DR and they release with the result that contact 230 of relay 7WTFSA interrupts the circuits for signal 7L governed by relays 7HR and 7DR and establishes a circuit for causing signal 7L to display its stop indication.

As relay 7WS is energized, energy of 75 code frequency is supplied over its front contact 236 and back contact 42 of relay 7HR to relay 7RECTM so that energy of 75 code frequency is supplied to the rails of section 7RT and when the train vacates this section this energy operates relay 7RWTR to cause coded energy to be supplied to the rails of section 7ART. This energy operates relay 8WTR to pick up relays 8WTFSA and 8HR but not relay 8DR. When relay 8HR picks up, its contact 68 interrupts the stick circuit for relay 8WS and relay 8WS releases since contact 162 of relay 8WAR is released and interrupts the pick-up circuit for relay 8WS. In addition, when relay 8HR picks up, its contact 47 changes the energy supplied to relay 8ECTM from 75 to 180 code frequency, but as relay 8DR remains released the coded energy supplied to the rails of section 8RT continues to be of reverse polarity, and energy of 180 code frequency and reverse polarity is supplied to the rails of section 10LT.

When relays 8WTSFA and 8HR pick up, the signal 8L is caused to display its caution indication.

The energy of 180 code frequency and reverse polarity supplied to the rails of section 10LT holds the contacts of relay 10LTRA in their right-hand or reverse position so that contact 54 interrupts the circuit leading to terminal 91A of the C. T. C. system field station unit 237 to cause indication codes sent to the office to maintain relay 8LBK released and keep the westbound block lamp dark to indicate that the block is occupied, and to maintain the stick circuit for relay 8LP and thus insure that westbound traffic will be maintained in the track stretch.

The energy of 180 code frequency supplied to the rails of section 10LT operates track relay 10LTR to hold relay 8LFR picked up and to pick up relay 10LDR so that signal 10LA will display its clear indication if the operator decides to clear this signal to permit a following train to enter the stretch.

It will be noted that relay 8WTFSA provides the directional control when the track section ahead of signal 8L is unoccupied, and that relay 8WS retains the directional control when this section is occupied. With this arrangement, one TM relay, one decoding transformer DT, one DR relay (8DR), and one HR relay (8HR) are sufficient for the control of the two signals 8L and 8R. If the stretch contains but one set of intermediate signals between the two passing sidings, then it becomes unnecessary to polarize the track circuit code for proper block indication because the 180 code decoding relay 10LDR will then indicate the unoccupied condition of the block when the track circuits are energized and traffic is established for the westward direction.

When the train vacates the stretch, energy of 75 code frequency supplied at the exit end of the stretch feeds over the rails of sections 6RT and 6ART and operates relay 7WTR to pick up relays 7WTFSA and 7HR to release relay 7WS and change the energy supplied to section 7RT from 75 to 180 code frequency.

When relays 7WTFSA and 7HR pick up, the signal 7L displays its caution indication instead of its stop indication.

On the supply of energy of 180 code frequency to section 7RT, energy of this frequency is supplied to section 7ART with the result that relay 8DR is picked up and causes signal 8L to display its clear indication while energy of 180 code frequency of normal polarity is now supplied to the rails of sections 8RT and 10LT. This energy causes the contacts of relay 10LTRA to move to their left-hand or normal position, while this energy operates relay 10LTR to keep relay 8LFR picked up and energy is supplied over front contact 52 of relay 8LFR and normal polar contact 54 of relay 10LTRA to terminal 91A of the field station unit and energy is also supplied over front contact 56 of relay 8LFR to terminal 89 of the field station unit. As energy is supplied to terminals 89 and 91A of the field station unit an indication code is sent to the office to keep relay 8LFK picked up and to pick up relay 8LBK so that the westbound traffic direction lamp and the westbound block lamp are both lighted to inform the operator that the stretch has been vacated.

In addition, as relays 8LFK and 8LBK are both picked up the stick circuit controlled by these relays for relay 8LP is interrupted, but, if lever 8 is in its left-hand position, the relay 8LP will be maintained energized by current supplied over its pick-up circuit.

At location K, Fig. 1*e*, upon receipt of coded energy of normal polarity over the rails of section 10LT, contact 65 of relay 10LTRA moves to its left-hand or normal position and interrupts the stick circuit of relay 8LSR and it releases.

If the operator does not wish to authorize another westbound train to enter the stretch and has not cleared one of the signals 10LA or 10LC, he may now restore the track circuit equipment to its normal deenergized condition by moving the lever 8 to its center position. During this movement of the lever the contact SK is closed to establish a circuit for relay 235ST to cause a control code to be sent to field station 235. In addition, on movement of lever 8 to its center position, a contact of the lever interrupts the pick-up circuit for relay 8LP and its contacts release, assuming that the block is unoccupied so that relay 8LBK interrupts one stick circuit for relay 8LP, and assuming that signals 10LA and 10LC are at stop so that relay 10LHK is released and its contact 161 interrupts the other stick circuit for relay 8LP. On release of relay 8LP its contact 158 interrupts the relay stick circuits while its contact 13 interrupts the circuit leading to terminal 87 so that the control code sent to the field station 235 causes release of relay 8LFSR with the result that its contact 26 interrupts the circuit of relay 6RTCTM and thus discontinues the supply of coded energy to the rails of the section 6RT so that relay 6RWTR ceases to supply coded energy to the rails of section 6ART and relay 7WTR ceases to operate and relays 7HR, 7WTFSA and 7DR release. At this time relay 7WS is released so that on release of relay 7HR the stick circuit for relay 7WS is not established and relay 7WS remains released.

On release of relay 7WTFSA its contact 230 interrupts the circuits for signal 7L governed by relays 7HR and 7DR and establishes a circuit to cause signal 7L to display its stop indication.

On release of relay 7RH at a time when relay 7WS is released contact 42 of relay 7HR discontinues the supply of coded energy to relay 7RECTM and it ceases to cause coded energy to be supplied to the rails of section 7RT and relay 7RWTR ceases to supply coded energy to the rails of section 7ART. Accordingly, relay 8WTR remains released and relays 8WTFSA, 8HR and 8DR release and put signal 8L to stop. At this time relay 8WS is released so that on release of relay 8HR the stick circuit for relay 8WS is not established and relay 8WS remains released.

On release of relay 8HR when relay 8WS is released contact 47 of relay 8HR discontinues the supply of coded energy to relay 8ECTM and thus cuts off the supply of coded energy to section 8RT and causes relay 8RWTR to cease supplying coded energy to the rails of section 10LT.

When the supply of coded energy to the rails of section 10LT is cut off, relay 10LTR remains released and relays 8LFR and 10LDR release. On release of relay 8LFR its contacts 56 and 52 interrupt the supply of energy to terminals 89 and 91A, respectively, of the C. T. C. system field station unit 237. At this time, relay 8LSR is released so that on release of contact 56 of relay 8LFR energy is not supplied to terminal 89. As terminals 89 and 91A are deenergized the indication code sent to the office releases relays 8LFK and 8LBK to extinguish the westbound traffic lamp and the westbound block lamp on the panel of the C. T. C. machine to indicate to the operator that the wayside equipment has ceased to establish westbound traffic in the stretch.

I shall now explain how traffic is set up for a move in the eastbound direction. Since relay 10LTCTM at location K is controlled over the back contacts 72 and 73 of relays 8LFR and 8LSR, respectively, it is not possible to energize this relay while traffic is established for a westbound move because one or the other of these relays will be energized, depending upon whether the stretch is unoccupied or occupied.

The circuit of relay 10LTCTM also includes front contact 212 of relay 10LKM which is picked up only when the signals 10LA and 10LC both display stop indications so relay 10LTCTM cannot be caused to supply coded energy to the rails of section 10LT if either of the signals 10LA or 10LC is displaying a permissive indication.

If, at a time when the stretch is prepared for westbound traffic, but is unoccupied and the signals 10LA and 10LC are at stop, the operator decides to establish eastbound traffic, he may do so by moving the lever 8 from its position L to its position R. On initial movement of the lever energy is supplied over contact SK and a contact L of the lever to starting relay 235ST to cause a control code to be sent to field station 235, while on movement of the lever 8 to its position R and prior to release of the lever energy is supplied over contact SK and a contact R of the lever to starting relay 237ST to cause a control code to be sent to field station 237.

On movement of the lever 8 away from its position L the pick-up circuit for relay 8LP is interrupted and the relay releases since it is assumed that signals 10LA and 10LC are at stop so that relay 10LHK is released and interrupts one stick circuit for relay 8LP, and as it is further assumed that the stretch is unoccupied so relay 8LBK is picked up and interrupts the other stick circuit for relay 8LP. Accordingly, relay 8LP releases and its contact 13 interrupts the circuit leading to terminal 87 and the control code sent to station 235 releases relay 8LFSR to cut off the supply of coded energy to the west end of the stretch and thereby deenergize the track circuit equipment throughout the stretch, as explained above, so that indication codes are sent to the office to release relays 8LFK and 8LBK and extinguish the traffic and block lamps on the panel of the C. T. C. machine.

In addition, on release of relay 8LP energy is supplied over a contact R of lever 8 and back contact 222 of relay 8LP to relay 8RP and its contacts pick up so that contact 223, Fig. 1b, establishes the circuit for supplying energy to terminal 87 of the C. T. C. machine when relay 237S picks up. Accordingly, the control code sent to the station 237 at this time picks up relay 8RFSR to cause coded energy to be supplied to relay 10LTCTM when the track circuit apparatus governing westbound traffic in the stretch ceases to function and relay 8LFR releases to close its back contact 72.

If at the time the operator decides to prepare the stretch for eastbound traffic the track circuit equipment is deenergized, the operation of the equipment to establish eastbound traffic is similar to that described above except that relay 8LFR is released and coding operation of relay 10LTCTM begins as soon as relay 8LFSR picks up.

In either case on coding operation of relay 10LTCTM, coded energy is supplied to the rails of section 10LT with the result that the track circuit apparatus functions in substantially the same manner as explained above in connection with establishment of westbound traffic in the stretch, to cascade or repeat coded energy through successive track sections to the west or entrance end of the stretch to pick up relays 8RFR and 6RDR.

When relay 8RFR picks up, energy is supplied over its front contact 225 to terminal 89 of the C. T. C. field station unit 235 and over front contact 226 of relay 8RFR and normal polar contact 6RTRA to terminal 91A of the field station unit so that indication codes are sent to the office to pick up relays 8RFK and 8RBK to light the eastbound traffic and block lamps on the C. T. C. machine control panel.

After picking up of relays 8RFR and 6RDR the signal 6RA or 6RC may be cleared upon transmission of a C. T. C. control code to pick up relay 6RHSR. The local circuits for controlling signals 6RA and 6RC are similar to those illustrated for signals 10LA and 10LC and a detailed description of these circuits is unnecessary.

The operation of the equipment during movement of an eastbound train through the stretch and to effect deenergization of the equipment after such a train movement is similar to that already described in connection with westbound traffic and a detailed explanation of the operation of the equipment at such times is unnecessary.

Referring for the moment to the selector relays 235S and 237S (shown in Fig. 1b) which control the transmission of code for energizing the westbound and eastbound traffic direction control relays 8LFSR and 8RFSR at field stations 235 and 237, respectively, it will be noted that energization of terminal 87 which is essential for code transmission, as will be apparent from the Lewis patent referred to hereinbefore, will not occur unless the lever 8 has been operated to its left or right-hand position and the corresponding lever repeater relay 8LP or 8RP is energized. The pick-up circuit for each lever repeater relay is checked over a back contact of the other lever repeater relay. Movement of lever 8 to the L position will pick up relay 8LP over the back contact 157 of lever repeater relay 8RP. Once relay 8LP picks up, a stick circuit will be completed therefor over its front contact 158. This stick circuit can be maintained either over the L contact of the lever, or over an auxiliary circuit which includes the back contact 159 of the block (unoccupied or occupied) indicator relay 8LBK and the front contact 160 of the traffic direction indicator relay 8LFK. A still further stick circuit for relay 8LP will be closed over the front contact 161 of the signal indication relay 10LHK which indicates that signal 10L displays a proceed aspect. Accordingly, no reversal of the traffic direction can take place while the stretch is occupied or while the entrance signal is cleared. The indication circuits controlled by relays 8LFK (terminal 89) and 8LBK (terminal 91A) are well known and will be obvious from the Lewis patent in which the corresponding terminals are numbered 89 and 91.

The form of traffic lever 8 which I prefer to use is one which has associated therewith a starting key SK which is closed during the preliminary motion of the lever, thus applying energy more quickly to the starting relay to avoid certain operating difficulties. Use of this type of lever makes it more easy to deenergize the track circuit apparatus by moving the lever to its N position, since the preliminary movement of the lever (before contact L or contact R opens), makes it possible to transmit the deenergizing code to the respective field station. However, this type of lever is not essential in the operation of my system, and an ordinary traffic lever may be used.

Referring next to Figs. 2*a* and 2*b* which show a highway crossing application of the apparatus embodying my invention, it will be seen that the single track stretch 1—3 is intersected by a highway at location 2. It will be understood that this highway crossing stretch is located at some point in the single track between the passing sidings PS1 and PS2 of Fig. 1 but has been shown as a separate portion of the complete system to simplify the disclosure.

Since the track circuits are normally deenergized, it becomes necessary to employ a different form of energy for clearing out the highway crossing control apparatus than the energy which is normally used for track circuit operation. Accordingly, I make use of current impulses of a code substantially slower than the signaling code, such for example as a code in which the current is interrupted at the rate of 20 times per minute.

Assuming now that the traffic lever 8 of Fig. 1 is in its neutral or N position so that neither traffic direction is established, the code transmitter 20CT at location 3 which supplies the 20 code will be energized over the back contacts 75 and 76 of the code detecting relays 3ECDR and 3WCDR, respectively, and will apply 20 code to the track circuit 2ET—3WT. This supply circuit may be traced from the upper rail at location 3, wire 77, back point of contact 78 of relay 3ETI, wire 79, front point of contact 80 of coder 20CT, wire 81, battery TB, and wires 82 and 83, to the lower rail. This code will be received at location 2 and will operate the code following relay 2ETR over a circuit which can be readily traced and which includes the back point of contact 184 of relay 2WCDR. Operation of relay 2ETR causes pick-up of the ETFSA (eastbound front contact slow acting repeater) relay followed by pick-up of the ETBSA (eastbound back contact slow acting repeater) relay after front contact 185 of relay ETFSA closes. These repeater relays bridge the operation of relay 2ETR on 20 code and the closure of front contact 186 of relay ETBSA thus provides a check that relay 2ETR is following code and completes the energizing circuit for relay ETM.

At location 1, 20 code is similarly applied to the track circuit 1ET—2WT so that relay 2WTR follows 20 code and causes relays WTFSA, WTBSA, and WTM to become energized in the same manner as just described. With relays WTM and ETM both energized, the highway crossing control relay XR will be energized over the front contacts 106 and 108 of these relays so that the highway crossing signals will remain inactive.

It should be pointed out that since relays ETFSA and ETBSA are sufficiently slow acting to remain picked up on 20 code, they will also remain picked up on 75 and 180 code. However, the ECDR and WCDR relays are so designed as to pick up and to remain picked up on 75 and 180 code, but to release on 20 code.

Assuming next that traffic is established for a westbound move, coded energy of either 75 or 180 code will be applied to relay 1WTR (depending on traffic conditions in advance) which will cause energization of relay 1WCDR from the decoding transformer 1DT in well-known manner by virtue of the operation of the coding contact 189 and rectifying contact 190 of relay 1WTR. Energization of relay 1WCDR opens the circuit for coder 20CT at back contact 191, thus removing 20 code from the track circuit 1ET—2WT which controls the crossing.

Code operation of relay 1WTR at 75 or 180 code causes this code to be repeated over front contact 192 into the track circuit 1ET—2WT so as to cause operation of the code following relay 2WTR at the crossing at 75 or 180 code instead of 20 code. Relay 2WCDR will now become energized and will close a circuit for operating the coding relay CTM which relays the code from section 1—2 into section 2—3. The circuit for operating relay CTM includes front contact 193 of relay 2WTR, wire 194, front point of contact 195 of relay 2WCDR, wire 196, back point of contact 197 of relay 2ECDR, and wires 198 and 199, to relay CTM. The code feed circuit for section 2—3 includes the front point of contact 184 of relay 2WCDR and the coding contact 100 of relay CTM.

It is obvious that instead of using relay CTM, the code could be repeated over a contact of the track relay itself. However, it is advantageous from the standpoint of sensitivity to employ as few contacts on the track relay as possible. Therefore, I prefer to use the CTM repeater. Moreover, one CTM relay suffices for repeating the code in either direction, as will be obvious from the symmetrical arranegment of the apparatus at location 2. It will be noted that coded track circuit energy of 75 or 180 code may be applied to the location 2 end of section 2—3 at the same time that coded track circuit energy of 20 code is applied to the location 3 end of the section. The energization of relay 2WCDR will open the control circuit of relay 2ETR, thus deenergizing this relay. Relays ETFSA and ETBSA will, however, retain their front contacts closed (due to their slow release characteristic) to bridge the open period of 20 code. During the first open period of 20 code in section 2—3, the 75 or 180 code will operate relays 3WTR and 3WCDR at location 3. The pick-up of relay 3WCDR opens the circuit for coder 20CT at its back contact 76, thus removing 20 code from section 2—3. The circuit for relay 3WTR will remain effective over the back point of contact 80 of coder 20CT since this coder is so designed as to close this contact, when deenergized.

The energization of relay 2WCDR at the crossing causes the release of relays 2ETR, ETFSA and ETBSA also at the crossing, but since relay 3WCDR is now energized, relay ETM is continued energized by the circuit over front contact 101 of relay 3WCDR so that the highway crossing signals remain inoperative. The receipt of 75 or 180 code by relay 2WTR at the crossing will continue to maintain relays WTFSA and WTBSA energized (these were previously energized on 20 code) so that relay WTM will also remain energized.

When a westbound train enters the section from the right and passes location 3, relay 3WTR will release because of the train shunt, followed by the release of relays 3WCDR and ETM, in turn. The opening of front contact 108 of relay ETM deenergizes relay XR which thereby initiates operation of the highway crossing signals. Relay WSR will be energized at this time over the back points of contacts 102 and 103 of relays ETM and ESR and will prepare a stick circuit for itself at front contact 104. This stick circuit will become effective with the closing of back contact 105 as soon as relay WTM is released due to the occupancy by the train of track section 1—2 which results in the shunting of relay 2WTR. The energization of relay WSR will close a path around front contact 106 of relay WTM at its front contact 107 so as to prepare a pick-up circuit for relay XR which will be effective as soon as the train vacates section 2—3 and front contact 108 of relay ETM closes. The pick-up of relay XR will cause the highway crossing signals to cease operating, in the usual manner.

During the time that section 1—2 is occupied, even though section 2—3 has been vacated, relay 2WCDR will remain deenergized so that track circuit energy of 75 or 180 code cannot be supplied to section 2—3. However, energy of 20 code will be applied to section 2—3, as previously described, whereby relays 2ETR, ETFSA, ETBSA, and finally ETM will be energized, thus cutting out the operation of the highway crossing signals through pick-up of relay XR, as indicated above.

When the westbound train vacates section 1—2 and passes beyond the next signal of the single track stretch, 75 code will be fed to the track circuit in the rear of the signal and by a cascading action, this 75 code will be repeated into all of the track circuit sections between that signal and the next signal in the rear thereof. The presence of 75 code in section 2—3 will remove the supply of 20 code to this section in the manner previously described.

It will be apparent that the highway crossing apparatus which I have provided is such that it will operate properly to provide protection even though it should prove impossible to set up the traffic direction by means of the 75 or 180 track circuit code and a train enters the block under train order authority. The presence of 20 code for highway crossing control under this condition makes it possible to provide proper and safe operation notwithstanding unforeseen failure of the ordinary track circuit code or its associated apparatus.

Referring next to Figs. 3*a*, 3*b*, and 3*c*, these taken together in that order show a single track stretch similar to that shown in Figs. 1*a*–1*e*, but having two intermediate sidings or turnouts T1 and T2 at locations F and H, respectively. The system shown in these figures makes application of the apparatus embodying my invention to the control of electric switch locks which are associated with the track switches for these turnouts.

In order to permit a train to leave a siding at an electrically locked switch, for example, the siding T2 at location H when the stretch is unoccupied, traffic would have to be established in one direction or the other by a movement of lever 8 as described in connection with Figures 1*a*–1*e*. I shall assume that traffic is established in the westbound direction, as described in detail in connection with Fig. 1. The operation of traffic lever 8 to the L position as described in detail in connection with the apparatus of Fig. 1 results in the energization of relay 8LFSR which applies coded energy to the track circuit 6RT in the rear of signal 6L. Since the switch lock control relay 7RWSR at location D is deenergized at this time, the polarity of this code is positive so as to operate the polarized relay 6RTWTRA at the cut section location E to its normal position in which the polar contacts 109 and 110 are closed to the left. This causes the biased polar relay 6RTWTR to pick up. The code received by relay 6RTWTR will be repeated by relay 6RTWTM (which itself is a repeater of relay 6RTWTR) over a circuit which includes the front point of contact 111 of relay 6RTWTM, polar contact 112 of relay 6RTWTRA closed to the left, and front contact 113 of relay 7OTWM, into the section 7T. This circuit is the same as previously described (for Fig. 1) in connection with cut sections involving polarized TRA relays for the control of the block indication except for the addition of the contact of the OTWM relay. This relay repeats the deenergized position of the electric switch lock 7W, the unoccupied condition of the short releasing track section 7OT (by means of the front contact 114 of relay OTR), the contact of the usual time element release TER, and the back contact 115 of the stick relay 7S. The function of this portion of the apparatus will be described hereinafter.

The application of code of positive polarity to the section 7T will be detected at signal location G by relays 8WTRA and 8WTR, in the manner previously described, and this code will be decoded in the usual manner to energize relay 8WHR alone, if signal 6L is at stop (75 code to the rear); or to energize both relays 8WHR and 8WDR if signal 6L indicates approach or clear (180 code to the rear of the signal). The energization of relay 8WHR will cause 180 code to be supplied to relay 8ECTM at location H over a circuit which includes the 180 code terminal 180B, front point of contact 116 of relay 8WHR, front contact 117 of relay 80TWM, and back contacts 118 and 119 of relays 8EHR and 8ES, to relay 8ECTM. The operation of relay 8ECTM on 180 code will repeat this code into section 8T and thence into section 10LT to operate relays 10LTRA and 10LTR at signal 10R. The control circuits for the coding relays 9ECTM and 9WCTM are not shown for simplicity, but it will be understood that these control circuits are similar to those shown and described for the coding relay 8ECTM. The decoding relays HR and 9WDR at location I are also not shown (except by their contacts), for simplicity, since these relays and their control circuits are identical with the corresponding apparatus at locations G and H.

With relay 9WDR at location I energized (front point of contact 120 closed) the code fed to the track circuit 10LT will be of positive polarity so as to close the normal or left-hand contacts 121 and 122 of relay 10LTRA, thereby providing the proper block indication on the track model. When relay 10LTRA is energized on this code, relay 8LFR of Fig. 1e will be energized and will transmit an indication to illuminate the traffic direction arrow on the track model for a westbound move. A clear block indication will also be established on the track model because of the normal polarity energization of relay 10LTRA. The operator may now position lever 7 at the control office to the left-hand or L position and send out a code to energize terminal 82 of the field station unit so as to energize relay 7LWSR at location K which will be picked up over the front contact 123 of relay 8LFR. If a westbound train is in the section, relay 8LSR will be energized so that relay 7LWSR could be picked up over front contact 124 of that relay. After pick-up, relay 7LWSR closes a stick circuit from terminal 83 of the field station unit over its own front contact 125. The energization of relay 7LWSR picks up relay 8LSR over front contact 126 to thereby retain control of the traffic direction indication at the control office.

After the code has been sent to the end of the single track stretch to energize relay 7LWSR at location K, the operator may instruct the trainman to operate the knife switch 8KS associated with the electric switch lock 7W at location H for the purpose of completing a circuit for relay 8S. This relay will pick up and thereby open its back contact 127 which is included in the circuit for relay 8OTWM, thus deenergizing this relay and thereby opening front contact 117 in the circuit of relay 8ECTM. The release of relay 8ECTM will cut off the code from section 8T and also from section 10LT, up to signal 10R.

The resulting deenergization of code detecting relay 8LFR will complete the circuit for relay 10LTCTM at its back contact 128 so that, with relay 7LWSR at location K energized, code of negative polarity will be applied to the track at location K, over the front point of contact 129 of relay 7LWSR and the front point of contact 130 of relay 10LTCTM. This code will be either 75 or 180 depending upon the position of signal 10R (position of contact 87 of relay 10RAHR).

The negative polarity code will be detected at signal 9R, location I, and will cause relay 9ETRA to close its polar contacts in the reverse or right-hand position, whereby relay 7RWR will become energized over contact 131 in its right-hand position. Relay 7RWR will now close its front contact 132 and in so doing will cause negative polarity code to be applied to the track section 8T. This code will be detected by relay 8ETRA at location H.

The negative polarity code received by relay 9ETR at location I will be decoded in the same manner as described for the other intermediate signal location. Also, the control of the code supply into the adjoining track circuit 8T by the operation of relay 9WCTM will be clear from the previous description presented in connection with the apparatus of Fig. 1.

With relay 9ETRA energized on code of negative polarity, relay 8ETRA will also be energized to its reverse position so that its normal polar contact 133 will be open. Accordingly, the eastbound directional stick relay 8ES will then be deenergized. This arrangement prevents improper operation of the stick relays such as might otherwise cause a locked-up condition in which both relays WS and ES at adjoining locations would be picked up when a train enters the main track at an electric switch lock. This condition might result from the fact that coded energy is applied to both ends of the section at the same time so that no particular direction of traffic is then established. It is to prevent the possibility of such a locked-up condition that I employ code of reverse polarity supplied to the track circuit at one end of the section when an electric switch lock is involved.

The negative polarity code received by relay 8ETR will be decoded in the usual manner to energize relay 8EHR which causes energization of relay WEHSM. Closing of the front contact 134 of relay WEHSM completes a circuit over front contact 135 of relay 8S to illuminate the indication lamp LW at the electric switch lock at location H. When this indication is received, the trainman will restore the knife switch 8KS to its normal or closed position so as to complete a circuit for energizing the switch lock 7W. This circuit may be traced from the knife switch 8KS, wire 136, front contacts 137 and 138 of relays WEHSM and 8S, respectively, and wire 139, to the switch lock 7W. Relay WEHSM becomes energized when either of the relays 8WS or 8WHR is energized at the same time that either relay 8EHR or 8ES is energized, as will be obvious from the drawing.

When the switch is unlocked the switch may be reversed and the train may enter the main track and proceed westward toward signal 6L. If relay 8WTRA at location G receives coded energy of normal polarity, the following stick relay 8WS may be energized over a circuit which includes the front point of contacts 140, 141, and 142 of relays 8W, 8OTR, and 8WHR. Relay 8WS will remain energized upon the occupancy of track circuit 8OT, over a circuit which includes its own front contact 143, the back point of contact 141 of relay 8OTR, now released, and the front point of contact 142 of relay 8WHR. When relay 8WHR releases following the movement of the train out of track circuit 8OT into section 7T, the back point of contact 142 of relay 8WHR will be substituted for the back point of contact 141 of relay 8OTR in the stick circuit for relay 8WS.

It will be noted that relay 8S becomes energized following the opening of the knife switch 8KS and that when the indication light is received, the knife switch is restored to its closed position. In order to retain relay 8S energized until the unlock has been accepted, a stick circuit has been provided for relay 8S which includes the front contacts 144 and 145 of relays WEHSM and 8S. Accordingly, relay 8S will remain energized until the switch is opened and relay 8WTR is shunted so as to deenergize relays 8WHR and WEHSM.

If, for some reason, coded energy cannot be received over the track circuits 7T and 8T to the switch lock location, it will then be necessary to operate the time element release TER which is provided to take care of this contingency. Operation of the time release will release the electric switch lock with the circuit including the knife switch 8KS in its normal position, by closing a circuit to the switch lock over the time release contact 146 which is designed to close a predetermined time following the operation of the time release, in the well-known manner.

Should a westbound train wish to enter the turnout T2, it would not be possible for relays 8ETRA and 8ETR to receive coded energy if any portion of the train remained on the track circuit 8T of the main track. It is therefore necessary to make use of the short releasing track circuit 8OT immediately ahead of the switch so that when this track circuit is occupied, the switch lock may be energized directly over the circuit which includes the closed knife switch 8KS, and the back contact 147 of relay 8OTR.

From the foregoing description, it will be seen that coded energy is fed from each end of the single track stretch toward the electric switch lock location and when this energy is detected at the switch lock, this indicates that the single track stretch is unoccupied or that, if occupied, the train is moving away from the switch lock location toward one or the other end of the section and has cleared the adjacent intermediate signal.

The control of the electric switch lock at the cut section location F is similar to that described for the electric switch lock at location H. In the cut section arrangement, as in the signal arrangement just described, separate EHR and WHR relays with their individual decoding transformers are required to secure an unlock for the electric switch lock. The decoding circuits in this instance are normally deenergized and become energized when relay 7S picks up and closes its front contact 148 following the operation of the knife switch 7KS to the right so as to energize wire 149.

It will be observed that two relays 7RWSR and 7LWSR have been provided one at each end of the stretch for the control of the electric switch locks. The relay to be selected and energized when a switch is to be unlocked will be the one located at the entrance end of the stretch for the particular direction of traffic, as established by the position of traffic lever 8. The circuits in the C. T. C. machine at the control office will accordingly be so arranged that the code will automatically be sent to the proper one of these two relays in accordance with the position of lever 7 which, as here shown, corresponds with the position of the traffic lever 8 of Fig. 1. That is to say, if the traffic lever 8 occupies its L position (for westbound traffic) then with the switch lever 7 also in the L position, a code is sent out to the field station unit at location K for energizing terminal 82 and relay 7LWSR, but code is not sent out to the field station unit at location D at the other end of the stretch. The latter unit will receive code and relay 7RWSR will become energized only after both levers 8 and 7 occupy their R position (for eastbound traffic). It is not necessary, however, that the coding circuits on the control machine at the office should be so selected that the control code for these relays is transmitted to the entrance end of the block only, for if codes were sent to both ends of the stretch, the relay at the entrance end of the block would be the only one to pick up because it is only at that end of the block that the code detecting relay (8LFR or 8RFR) would then be energized. In the system embodying my invention, it is unnecessary for the operator to establish an additional control from the C. T. C. machine to the switch lock when a train occupying the main track wishes to enter an electrically locked switch, as the switch will be unlocked automatically by virtue of the occupancy of the releasing track section OT.

The switch lock control apparatus shown in Fig. 3 is adequate if not more than two pairs of intermediate signals are located within the single track stretch (two pairs are shown in Fig. 3). For a greater number of intermediate signals, the modified circuit arrangement shown in Fig. 4 of Sh. 2 may be used for the control of the ES relay. This figure shows the control arrangement for the eastbound stick relay (ES), but it will be understood that a similar control would be used for the westbound stick relay (WS). In the arrangement shown in Fig. 4, the first train through the block will energize relay ES. Relay ES will remain energized through its stick circuit until the block is vacated when coded track circuit energy of negative polarity will be received to energize relay EHR. Before relay ES opens its front contacts, a circuit is complete through reverse polar contact 151 (closed to right) of relay ETRA to energize relay ESA which will be retained in its energized position by the same circuit just traced except through a front contact of relay ESA instead of relay ES. Relay ESA will remain energized until the train clears the block, so that following trains will cause relay ES to be energized over the front contact 150 of relay ESA rather than the normal polar contact 151 of relay ETRA which will remain in its reverse position until the train clears the block. Of course, with the arrangement of Fig. 4, if the block is occupied by an eastbound train and a second train enters at the switch lock SW shown in the track diagram of Fig. 4*a*, the ES relay at signal 4 location may be energized even though this second train proceeds in the westbound direction after entering the main track at the switch lock. The lever circuits shown in Fig. 1*b* will, however, retain coded energy in the block for an eastbound move until such time as both trains clear the block so that no difficulty would be experienced through improper operation of the following stick relays.

From the foregoing description it will be apparent that I have provided a signaling system for a stretch of single track, two-direction railway which combines C. T. C. control with coded wayside signaling in a novel manner such that no control line wires (except those involved in highway crossing control) apart from the C. T. C. code line are required. Since the system is of the normally deenergized type, it lends itself readily to primary battery operation in territory where the ordinary commercial power sources are not available. Operation of a traffic lever at a central control location establishes the permitted direction by applying code at the exit end of the stretch, which code when cascaded to the entrance end checks unoccupancy of the stretch and permits clearing of the entrance signal. Passage of the train approach energizes the approach relays as these are approached, and the approach relays are included in the control for the following directional stick relays so as to provide proper directional control since the use of the advance track circuit for this purpose, as is the usual case, is not possible because of the normally deenergized condition of the track circuits of the system. Deenergization of these track circuits brings on the normal condition of the system and cannot, therefore, be used for the directional control function. Polarized track circuit code is used to detect the occupied condition of the stretch and to indicate this condition by means of traffic lights on the track model in the C. T. C. control office. Where the stretch includes but one intermediate signal location, the 180 code decoding relay may be used to provide the block indication. Traffic direction is retained during occupancy by intercontrols on the C. T. C. machine which prevent the operator from interfering with the traffic direction once the stretch is occupied until the train passes completely out of the stretch. The apparatus embodying my invention also provides for proper control of highway crossing apparatus through the use of an additional code such as 20 code for detection purposes. Moreover, the apparatus embodying my invention lends itself readily to the control of electric switch locks without any line wires other than those required for the C. T. C. line circuit.

Although I have herein shown and described only a few forms of railway traffic controlling apparatus embodying my invention, it is understood that various changes and modifications may be made therein within the scope of the appended claims without departing from the spirit and scope of my invention.

Having thus described my invention, what I claim is:

1. In combination with a stretch of single track over which traffic may move in either direction, said stretch being divided into a plurality of track circuit sections, a traffic direction control relay, manually controlled means at a control office for operating said traffic direction relay, means effective when said traffic direction relay is operated for cascading current impulses of a track circuit code from the exit end of said stretch for a given traffic direction over said sections to the entrance end for establishing said traffic direction, an entrance signal, code responsive means operated in response to the code received at the entrance end, means controlled from said office and effective when said code responsive means is operated for clearing said entrance signal, and means at said control office effective when said entrance signal is cleared for preventing interference with the established traffic direction.

2. In combination with a stretch of single track over which traffic may move in either direction, manually controlled means at a control office, direction selecting means in the trackway responsive to operation of said manually controlled means for establishing traffic in a given direction over said stretch, means adjacent the exit end of said stretch for said given direction and controlled by said direction selecting means for transmitting coded rail current impulses from said exit end to the entrance end, an entrance signal, control means operated in response to the receipt of said rail current impulses at said entrance end, means controlled from said office and effective when said control means is operated for clearing said entrance signal, and means at said control office effective when said entrance signal is cleared for preventing operation of said direction selecting means to interfere with the established direction of traffic in said stretch.

3. In combination with a stretch of single track over which traffic may move in either direction, a manually controlled selector at a control office having a first and a second position, traffic direction control means in the trackway selectively responsive to operation of said selector to said first or said second position for establishing traffic in one or the other direction respectively over said stretch, means adjacent one end of said stretch governed by said traffc direction control means and effective when the selector is in its first position for transmitting coded rail current impulses from said one end to the other end of said stretch, means adjacent said other end also governed by said traffic direction control means and effective when said selector occupies said second position for transmitting coded rail current impulses from said other end to said one end of the stretch, an entrance signal at each end of the stretch, control means at each end operated in response to the receipt of said coded current at the associated end of the stretch, means at each end controlled from said office and effective when the associated control means is operated for clearing the entrance signal at that end, and means at said control office effective when either signal is cleared for preventing interference with the established traffic direction.

4. In combination with a stretch of single track over which traffic may move in either direction, a westbound traffic direction control relay adjacent one end of said stretch, an eastbound traffic direction control relay adjacent the other end of said stretch, manually controlled means at a control office for selectively governing said eastbound or said westbound direction control relay to move its contacts between a first and a second position, a first and a second code detecting relay adjacent said one and said other end of said stretch respectively, a first normally deenergized stick relay adjacent said one end which is energized when a train enters said stretch at said one end, a second normally deenergized stick relay adjacent said other end which is energized when a train enters said stretch at said other end, means effective only when the contacts of said westbound traffic direction control relay are in their second position and the contacts of said first code detecting relay and said first stick relay are released for transmitting coded rail current impulses from said one end to said other end of the stretch to thereby energize said second code detecting relay and establish traffic in the westbound direction over said stretch, and means effective only when the contacts of said eastbound traffic direction control relay are in their second position and the contacts of said second code detecting relay and said second stick relay are released for transmitting coded rail current impulses from said other to said one end of the stretch to thereby energize said first code detecting relay and establish traffic in the eastbound direction over said stretch.

5. In combination with a stretch of single track over which traffic may move in either direction, a normally deenergized traffic direction control relay adjacent one end of said stretch, manually controlled means for energizing said direction control relay, means effective when said direction control relay is energized for transmitting coded rail current impulses from said one end to said other end of the stretch to thereby establish traffic in a given direction over said stretch, a normally deenergized stick relay adjacent said other end of the stretch, means effective when a train enters said stretch at said other end for energizing said stick relay, and means effective when said stick relay is energized for preventing a reversal of said given traffic direction.

6. In combination with a stretch of single track over which traffic may move in either direction, a normally deenergized traffic direction control relay adjacent one end of said stretch, manually controlled means for energizing said direction control relay, a normally deenergized code detecting relay adjacent the other end of said stretch, an entrance signal adjacent said other end, means effective when said direction control relay is energized for transmitting coded rail current impulses from said one end to said other end of the stretch to thereby energize said code detecting relay so as to establish traffic in a given direction over said stretch and permit clearing of said entrance signal, a normally de-energized stick relay adjacent said other end of the stretch, means effective when a train accepts said entrance signal and enters the stretch at said other end for energizing said stick relay, and means effective when said stick relay is energized for preventing a reversal of said given traffic direction.

7. In combination with a stretch of single track over which traffic may move in either direction, an intermediate signal location within said stretch, a first track circuit section within said stretch on one side of said intermediate signal location, a second track circuit section also within said stretch on the other side of said intermediate signal location, means including a code following track relay for said first section for cascading coded rail current impulses over said stretch from said first to said section section for establishing traffic in a given direction, a slow acting repeater relay energized over a front contact of said code following track relay, a directional stick relay, a code repeater relay energized over a front contact of said slow acting repeater relay, a pick-up circuit for said directional stick relay including a front contact of said slow acting repeater relay, and traffic controlling apparatus common to both said sections controlled by said code repeater relay.

8. In combination with a stretch of single track over which traffic may move in either direction, an intermediate signal location within said stretch, a first track circuit section within said stretch on one side of said intermediate signal location, a second track circuit section also within said stretch on the other side of said intermediate signal location, means including a code following track relay for said first section for cascading coded rail current impulses over said stretch from said first to said second section for establishing traffic in a given direction so as to permit a train to enter said stretch and approach said intermediate signal, a slow acting repeater relay which remains energized when said track relay is following code, a directional stick relay, a code repeater relay controlled over a front contact of said slow acting repeater relay, an approach relay for said second section which becomes energized when the train approaches within a predetermined distance of said intermediate signal, a pick-up circuit for said directional stick relay including a front contact of said approach relay and a front contact of said slow acting repeater relay, and traffic controlling apparatus common to both said sections controlled by said code repeater relay.

9. In combination with a stretch of single track over which traffic may move in either direction, an intermediate signal location within said stretch, a first track circuit section within said stretch on one side of said intermediate signal location, a second track circuit also within said stretch on the other side of said intermediate signal location, a westbound code following track relay for said first section, an eastbound code following track relay for said second section, means for supplying coded rail current impulses to said first section when the traffic direction is westbound to operate said westbound track relay, means for supplying coded rail current impulses to said second section when the traffic direction is eastbound to operate said eastbound track relay, a westbound and an eastbound slow acting repeater relay for said westbound and said eastbound track relay respectively, a westbound directional stick relay having a pick-up circuit including a front contact of said westbound repeater relay, an eastbound directional stick relay having a pick-up circuit which includes a front contact of said eastbound repeater relay, a code repeater relay having a first energizing circuit which includes a front contact of said westbound repeater relay and having a second energizing circuit which includes a back contact of said westbound repeater relay and a front contact of said eastbound repeater relay, and traffic controlling apparatus common to both said sections controlled by said code repeater relay.

10. In combination with a stretch of track over which traffic may move in either direction, an intermediate signal location within said stretch, a first track circuit section within said stretch on one side of said intermediate signal location, a second track circuit section also within said stretch on the other side of said intermediate signal location, a westbound traffic direction control relay for supplying rail current impulses of a first or of a second code to said first section in accordance with traffic conditions in advance thereof to establish westbound traffic direction over said stretch, means effective when said first or said second code is supplied to said first section for supplying rail current impulses of said second code to said second section, an eastbound traffic direction control relay for supplying rail current impulses of said first or said second code to said second section in accordance with traffic conditions in advance thereof to establish eastbound traffic direction over said stretch, means effective when said first or said second code is supplied to said second section for supplying rail current impulses of said second code to said first section, means for selectively operating said westbound or said eastbound traffic direction control relay, two code detecting relays for each of said sections one responsive only to said second code and the other responsive to both said codes, and a block indication circuit for each traffic direction controlled by the two code detecting relays associated with the established traffic direction.

11. In combination with a stretch of track over which traffic may move in either direction, an intermediate signal location within said stretch, a first track circuit section within said stretch on one side of said intermediate signal location, a second track circuit section also within said stretch on the other side of said intermediate signal location, a traffic direction control relay effective when operated for supplying coded rail current impulses of an approach code to said first section to thereby establish westbound traffic direction over said stretch, means for operating said traffic direction control relay, means responsive to the presence of said approach code in said first section for supplying coded rail current impulses of a proceed code to said second section, a code detecting relay for said second section selectively responsive to said proceed code, and block indication apparatus for said stretch controlled by said code detecting relay.

12. In combination with a stretch of track over which traffic may move in either direction, an intermediate signal location within said stretch, a first track circuit section within said stretch on one side of said intermediate signal location, a second track circuit section also within said stretch on the other side of said intermediate signal location, means for cascading coded rail current impulses of given polarity over said stretch from said first to said second section so as to establish traffic in the direction from said second to said first section and permit a train to enter said stretch, means effective after a train has entered said first section and has vacated said second section for supplying coded rail current impulses of reverse relative polarity to said second section, a polarity responsive code detecting relay for said section section, and block indication apparatus for said stretch controlled by said code detecting relay.

13. In combination with a stretch of track over which traffic may move in either direction, an intermediate signal location within said stretch, a first track circuit section within said stretch on one side of said intermediate signal location, a second track circuit section also within said stretch on the other side of said intermediate signal location, means for cascading coded rail current impulses of given polarity over said stretch from said first to said second section so as to establish traffic in the direction from said second to said first section and permit a train to enter said stretch, means effective after a train has entered said first section and has vacated said second section for supplying coded rail current impulses of reverse relative polarity to said second section, polarity responsive means for said second section operated by coded current of said reverse polarity, and signaling apparatus controlled by said polarity responsive means.

14. In combination with a stretch of track over which traffic may move in either direction, said stretch being divided into a plurality of block sections, manually controlled means for cascading coded rail current impulses from one to the other end of said stretch over said sections to detect unoccupancy and permit a train to enter the stretch, the coded rail current supplied to the entrance block section being of normal relative polarity, means effective when a train has vacated said entrance section and is occupying any portion of said stretch for supplying coded rail current impulses of reverse relative polarity to the entrance section, a polarized code detecting relay for said entrance section, and block indication apparatus for said stretch controlled by said polarized code detecting relay.

15. In combination with a stretch of track over which traffic may move in either direction, said stretch being divided into a plurality of block sections, manually controlled means for cascading coded rail current impulses from one to the other end of said stretch over said sections to detect unoccupancy and permit a train to enter the stretch, the coded rail current supplied to the entrance block section being of normal relative polarity, means effective when a train has vacated said entrance section and is occupying any portion of said stretch for supplying coded rail current impulses of reverse relative polarity to the entrance section, a polarized code detecting relay for said entrance section, means effective when the train has passed completely out of said stretch for restoring coded rail current of normal relative polarity to said entrance section, and block indication apparatus for said stretch controlled by said polarized code detecting relay.

16. In combination with a stretch of track over which traffic may move in either direction, said stretch being divided into a plurality of block sections, a westbound traffic direction control relay effective when energized for causing coded rail current impulses to be supplied to the westbound exit section and cascaded therefrom to the westbound entrance section for checking unoccupancy and permitting a westbound train to enter said stretch, the coded rail current supplied to said westbound entrance section being of normal relative polarity, an eastbound traffic direction control relay effective when energized for causing coded rail current to be supplied to said entrance section and cascaded therefrom to said exit section for checking unoccupancy and permitting an eastbound train to enter said stretch, the coded rail current supplied to said exit section being of said normal polarity, manually controlled means for selectively energizing said westbound or said eastbound traffic direction control relay according as the traffic direction being established is westbound or eastbound respectively, means effective when a westbound train within said stretch vacates said entrance section for supplying coded rail current of reverse relative polarity to said entrance section, means effective when an eastbound train within said stretch vacates said exit section for supplying coded rail current of said reverse polarity to said exit section, a polarized code detecting relay for each said entrance and said exit section, and block indication apparatus for said stretch controlled by said polarized code detecting relays.

17. In combination with a normally deenergized stretch of track over which traffic may move in either direction, an eastbound and a westbound track circuit for said stretch including the same track rails, a westbound track relay adjacent one end of said track circuit and a westbound source of rail current adjacent the other end, an eastbound track relay adjacent said other end and an eastbound source of current adjacent said one end, manually controlled traffic direction selecting means at a control office for selectively supplying rail current impulses from said westbound or said eastbound source to operate the associated track relay according as the traffic direction being established in westbound or eastbound respectively, an entrance signal adjacent each end of said stretch, said signals normally displaying a stop indication, means controlled by each track relay when operated for permitting the associated signal to be cleared, and means at said control office effective when one or the other said signal is cleared for preventing interference with the established traffic direction.

18. In combination with a stretch of track over which traffic may move in either direction, said stretch having a turnout therein, an electric switch lock associated with said turnout, a first track circuit section on one side of said turnout and a second track circuit section on the other side of said turnout both within said stretch, manually controlled means for cascading coded rail current impulses from said first to said second section for establishing traffic in a given direction over said stretch, the coded rail current in said first section being of normal relative polarity, manually controlled means effective when said stretch is unoccupied for discontinuing the coded current in said second section and supplying coded rail current impulses of reverse relative polarity thereto, and means effective when coded rail current of normal polarity is present in said first section and coded rail current of reverse polarity is present in said second section for permitting an unlock of said electric switch lock.

19. In combination with a stretch of track over which traffic may move in either direction, a traffic governing device for permitting entry of traffic into said stretch from a location intermediate the two ends of the stretch, a track circuit junction adjacent said traffic governing device for establishing a first and a second track circuit sections, means for transmitting coded rail current impulses in a given direction over said first section and over said second section, means for reversing the direction in which coded rail current impulses are transmitted over said second section, and code detecting means adjacent said junction responsive to the presence of coded rail current flowing in said given direction over said first section and in the reverse direction over said second section for controlling said traffic governing device.

20. In combination with a normally deenergized stretch of track over which traffic may move in either direction, a traffic governing device for permitting entry of traffic into said stretch from a location intermediate the two ends of the stretch, a track circuit junction adjacent said traffic governing device for establishing a first and a second track circuit section, manually controlled means for transmitting coded rail current impulses in a given direction over said first section and over said second section, manually controlled means for reversing the direction in which coded rail current impulses are transmitted over said section, and code detecting means adjacent said junction responsive to the presence of coded rail current flowing in said given direction over said first section and in the reverse direction over said second section for controlling said traffic governing device.

21. In combination with a normally deenergized stretch of track over which traffic may move in either direction, a traffic governing device intermediate the two ends of said stretch, a track circuit junction adjacent said traffic governing device for establishing a first and a second track circuit section, means for transmitting coded rail current impulses of normal relative polarity in a given direction over said first section and over said second section, means for discontinuing the normal polarity code in said second section and transmitting coded rail current impulses of reverse relative polarity in the reverse direction over said second section, and polarized code detecting means responsive to the presence of coded rail current of normal polarity flowing in said given direction in said first section and reverse polarity flowing in said reverse direction in said second section for controlling said traffic governing device.

22. In combination with a stretch of track over which traffic may move in either direction, a traffic governing device located intermediate the two ends of said stretch, a first section comprising a combined eastbound and westbound track circuit including the same track rails of said stretch and controlling the approach to said device from a given traffic direction, a second section comprising a combined eastbound and westbound track circuit including the same track rails of the stretch and controlling the approach to said device from the other traffic direction, means effective for transmitting coded rail current impulses over the westbound track circuit of said first section, means effective for transmitting coded rail current impulses over the eastbound track circuit of said second section, and means effective when said coded rail currents are simultaneously effective in said westbound and eastbound track circuits for controlling said traffic governing device.

23. In combination with a stretch of track over which traffic may move in either direction, a traffic governing device intermediate the two ends of said stretch, a track circuit junction adjacent said traffic governing device for establishing a first and a second track circuit section, manually controlled means for causing coded rail current impulses of normal relative polarity to be supplied to said first section and cascaded into said second section for establishing traffic in a given direction over said stretch, manually controlled means for discontinuing the supply of said coded current of normal polarity in said second section and supplying coded rail current of reverse relative polarity thereto, and polarized code detecting means for each said section for controlling said traffic governing device.

24. In combination with a stretch of track over which traffic may move in either direction, a traffic governing device intermediate the two ends of said stretch, a track circuit junction adjacent said traffic governing device for establishing a first and a second track circuit section, manually controlled means at a control office for causing coded rail current impulses of normal relative polarity to be supplied to said first section and cascaded into said second section for establishing traffic in a given direction over said stretch, manually controlled means in the trackway of discontinuing the supply of said coded current to the second section, manually controlled means also at said control office for supplying coded rail current of reverse relative polarity to said second section, and polarized code detecting means for each said section for controlling said traffic governing device.

25. In combination with a stretch of track over which traffic may move in either direction, said stretch being divided into a plurality of track circuit sections, a track switch located within said stretch, an electric switch lock for said track switch, means for cascading coded rail current impulses of normal relative polarity over said sections to establish traffic in a given direction over said stretch, means for discontinuing the supply of said coded rail current to the sections beyond said track switch location and cascading coded rail current impulses of reverse relative polarity over the deenergized sections in a direction toward said track switch, a directional stick relay for said given traffic direction, a repeater relay for said directional stick relay, a polarized track relay for one of said sections in which the polarity of said coded rail current has been reversed, a pick-up circuit for said directional stick relay including a normal polar contact of said polarized track relay, a pick-up circuit for said repeater relay including the reverse polar contact of said polarized track relay and a front contact of said directional stick relay, a stick circuit for said repeater relay including said reverse polar contact and a front contact of the repeater relay, an auxiliary energizing circuit for said directional relay including a front contact of said repeater relay, and a circuit for said electric switch lock controlled over a front contact of said repeater relay.

26. In combination with a stretch of track over which traffic may move in either direction, said stretch being intersected by a highway, a track circuit junction adjacent the highway intersection for establishing a first and a second track circuit section, means for cascading coded rail current impulses of a relatively fast code over said sections to establish traffic in a given direction over said stretch and permit a train to enter the stretch, a code detecting relay for each said section operated by said fast code, highway crossing apparatus, means effective when either code detecting relay is operated for rendering said highway crossing apparatus inoperative, whereby when a train enters one of said sections and causes the associated code detecting relay to release said highway crossing apparatus will become operative, means effective when the train vacates one of said sections for supplying coded rail current impulses of a relatively slow code to the vacated section, said code detecting relays being inoperative on said slow code, a detecting relay for said vacated section responsive to said slow code, and means controlled by said last-named detecting relay for restoring said highway crossing apparatus to its inoperative condition.

27. In combination with a stretch of track over which traffic may move in either direction, said stretch being intersected by a highway, a track circuit junction adjacent the highway intersection for establishing a first and a second track section, means effective when said stretch is unoccupied for supplying coded rail current impulses of a relatively slow code to said two sections, a code detecting relay for each of said sections operated by said slow code, highway crossing apparatus, means controlled by both said detecting relays when operated for maintaining said highway crossing apparatus inoperative, traffic direction control means for transmitting coded rail current impulses of a relatively fast code over said sections to establish traffic in a given direction over said stretch, a code detecting relay for each of said sections operated by said fast code but not by said slow code, means controlled by said fast code detecting relays for discontinuing the supply of said slow code in the associated section, means controlled by both said fast code detecting relays for also maintaining said highway crossing apparatus inoperative, means effective when a train enters one of said sections and releases the fast code detecting relay associated therewith for rendering said highway crossing apparatus operative, and means controlled by said fast code detecting relay effective when a train vacates said one section for restoring said highway crossing apparatus to its inoperative condition.

28. In combination with a stretch of track over which traffic may move in either direction, a traffic governing device at a location intermediate the two ends of the stretch, means for transmitting rail current over said stretch in a given direction both in advance and in the rear of said location, means for reversing the direction in which the rail current is transmitted in the rear of said location, and means responsive to the rail current flowing in the given direction in advance of said location and in the reverse direction in the rear of said location when said currents are jointly effective for controlling said traffic governing device.

29. In a coded track circuit system for a stretch of single track between the ends of passing sidings and divided into a plurality of track sections, a signal at one end of said stretch governing train movement into the stretch, means for transmitting code pulses over the track rails of said track sections for governing the indications of said signal and providing code pulses at a particular rate only if the stretch is unoccupied, decoding means associated with said signal for governing its indications and distinctively responsive to code pulses of said particular rate, indicating means including a changeable indicator at a distant control office and rendered active by the entrance of a train into said stretch for indicating occupancy of the stretch, and means for restoring said indicating means to its inactive condition only when the stretch becomes unoccupied and said decoding means responds to code pulses at said particular rate.

30. In a coded track circuit system for a stretch of single track between the ends of passing sidings divided into a plurality of track sections, coding means for the respective track sections manually controlled from a distant control office for at times transmitting code pulses over the track rails of each track section in turn dependent upon coding in the same direction in the next adjoining track section, said code transmitting means cooperating only if the stretch is not occupied to provide driven code pulses at a particular code rate at one end of the stretch, a signal at each end of the stretch for governing train movement into the stretch, decoding means for each end of the stretch for governing the indications of the associated signal and including relay means energized only when said particular code rate is being received at the corresponding end of the stretch, and indicating means in the control office governed by said relay means for indicating occupancy of the stretch.

31. Railway traffic controlling apparatus comprising a signal at each end of a traffic block, a code type communication system connecting the ends of said block with a control office, a system of reversible circuits extending the length of said block for controlling said signals in accordance with traffic conditions in said block, means at the ends of said block manually governed from said office through said code communication system to at times condition said system of reversible circuits to prepare said stretch for traffic in one direction and thereby permit clearing of the signal at one end of said block and to at other times condition said system of reversible circuits to prepare said stretch for traffic in the other direction and thereby permit clearing of the signal at the other end of said block, means at each end of said block manually controlled from said office and effective only when said system of reversible circuits has prepared the stretch for traffic in the corresponding direction for clearing the signal at that end of said block, means responsive to operation of said system of reversible circuits to prepare the stretch for traffic in either selected direction to operate through said code communication system indication means at the office to show that the stretch has been prepared for traffic, and means effective during occupancy of said stretch for maintaining said indication means in operation.

32. In a coded track circuit signaling system for a stretch of single track having a track section at each end, a signal at each end of the stretch governing train movement into said stretch, coding means for each track section for transmitting code pulses over the track rails of that track section toward the associated signal for governing its indications, means manually controlled from a distant control office for governing the operation of said coding means so that at times traffic is established in one direction and at other times is established in the other direction and at still other times is not established in either direction, said coding means operating to provide code pulses toward only one of said signals in accordance with the direction of traffic manually established and for governing the clearing of that signal, indication means at said control office capable of designating traffic in neither direction or in one direction or the other in said stretch, and code responsive means for each end of said stretch for governing said indication means to cause it to designate the direction of traffic for which said stretch has been prepared.

33. In a coded track circuit signaling system for a stretch of single track having a track section at each end, a signal at each end of the stretch governing train movement into said stretch, coding means for each track section for transmitting code pulses over the track rails of that track section toward the associated signal for governing its indications, means manually controlled from a distant control office for governing the operation of said coding means so that at times traffic is established in one direction and at other times is established in the other direction and at still other times is not established in either direction, said coding means operating to provide code pulses toward only one of said signals in accordance with the direction of traffic manually established and for governing the clearing of that signal, indication means at said control office capable of designating traffic in neither direction or in one direction or the other in said stretch, code responsive means for each end of said stretch for governing said indication means to cause it to designate the direction of traffic for which the stretch has been prepared, and means for each end of the stretch and actuated by movement of a train into the stretch and maintained actuated until code pulses are again received at that end of the stretch for also governing said indication means to cause it to designate the direction of traffic for which the stretch has been prepared.

34. In a coded track circuit system for a stretch of track divided into three track sections, means for transmitting code pulses over the track rails of said track sections to either end of the stretch and providing code pulses at the end of the stretch having a type dependent upon the presence of a train in different track sections of the stretch, a first type of coded energy being received at an end of the stretch only if all track sections of the stretch are not occupied and a second type of coded energy being received if the two track sections nearest said end of the stretch are not occupied and the track section farthest from said end of the stretch is occupied, a signal at each end of the stretch, decoding means at each end of the stretch selectively responsive to coded energy of said first and second types for permitting the associated signal to display its clear indication when coded energy of either of said types is being received, and means governed by response of said decoding means to coded energy of said first type for indicating in a distant control office traffic conditions in said stretch.

35. In a coded track circuit system for a stretch of single track divided into more than two track sections, signals for governing train movement into and over said stretch in opposite directions, coding means associated with each of said track sections for transmitting code pulses in either direction over the track rails of said track sections, means manually controlled from a distant control office for governing the operation of said coding means to provide signal clearing code pulses in said track sections in one direction to clear signals for a corresponding direction of traffic while holding the opposing signals at stop, means for governing said coding means to provide code pulses of a first type at the end of said stretch only when said entire stretch is unoccupied, means for governing the code means for the track sections in the rear of a train to provide code pulses of a second type only when a predetermined portion of said stretch including more than one track section is not occupied, decoding means at each end of the stretch selectively responsive to coded energy of said first and second types for permitting the associated signal to display its clear indication when coded energy of either of said types is being received, and occupancy indicating means in said control office governed by response of said decoding means to coded energy of said first type.

36. In a coded track circuit system for a stretch of track through which traffic may move in either direction between a first and a second location, said track stretch being divided into a plurality of track sections and including a track switch at an intermediate point in said stretch, means for transmitting coded rail current over the rails of said stretch from the first to the second location, means for transmitting coded rail current over the rails of said stretch from the second to the first location, an electric lock for said track switch, and means for releasing said switch lock effective when coded rail current impulses are received over the track rails at the switch location in response to the supply of coded energy to the track rails at both ends of the stretch.

37. In combination, a stretch of railway track over which traffic may move between a first and a second location, said track stretch being divided into a plurality of track sections and including a track switch at an intermediate point in said track stretch, a signal at said first location governing entrance of traffic into said stretch, a first control circuit over which energy is supplied only when the portion of said stretch between said switch and said second location is unoccupied or is occupied by a train moving towards said second location, a second control circuit over which energy is supplied only when said signal is at stop and the portion of said stretch between said switch and said first location is unoccupied, an electric lock for said track switch, and means for releasing said switch lock when energy is received over both of said control circuits.

38. In combination, a stretch of railway track over which traffic may move in either direction between a first and a second location, said track stretch being divided into a plurality of track sections and including a track switch at an intermediate point, a first signal governing entrance of traffic into said stretch at said first location, a second signal governing entrance of traffic into said stretch at said second location, a first control circuit over which energy is supplied only when said second signal is at stop and the portion of said stretch between said switch and said second location is unoccupied or is occupied by a train moving towards said second location, a second control circuit over which energy is supplied only when said first signal is at stop and the portion of said stretch between said switch and said first location is unoccupied or is occupied by a train moving towards said first location, an electric lock for said switch, and means for releasing said switch lock when energy is received over both of said control circuits.

39. In combination, a stretch of railway track over which traffic may move between a first and a second location, said track stretch being divided into a plurality of track sections and including a track switch at an intermediate point, means for supplying coded energy over the rails of the stretch from said second location to a point adjacent said switch provided the portion of said stretch between said switch and said second location is unoccupied, a first control circuit to which energy is supplied provided coded energy is being received at said switch from said second location or the portion of said stretch between said switch and said second location is occupied by a train moving towards said second location, a signal governing entrance of traffic into said stretch at said first location, means effective only when said signal is at stop for supplying coded energy over the rails of the stretch from said first location to a point adjacent said switch provided the portion of said stretch between said switch and said first location is unoccupied, a second control circuit to which energy is supplied provided coded energy is being received at said switch from said first location, an electric lock for said switch, and means for releasing said switch lock when energy is received over both of said control circuits.

40. In a coded track circuit system for a stretch of track divided into three track sections, means for transmitting code pulses over the track rails of said track sections to either end of the stretch and providing code pulses at the end of the stretch having a type dependent upon the presence of a train in different track sections of the stretch, a particular code type being received at an end of the stretch only if all track sections of the stretch are not occupied and another code type being received if two track sections are not occupied, a signal at each end of the stretch, decoding means separately responsive to said particular code type and said another code type for governing the clear indication of each signal when either of said code types is received, and means governed by the decoding means responsive to said particular code for indicating in a distant control office traffic conditions in said stretch.

JAMES J. VAN HORN.

REFERENCES CITED

The following references are of record in the file of this patent:

UNITED STATES PATENTS

| Number | Name | Date |
|---|---|---|
| 1,852,548 | Wight | Apr. 5, 1932 |
| 1,895,013 | Stoker | Jan. 24, 1933 |
| 1,919,279 | Kemmerer | July 25, 1933 |
| 1,998,178 | Wallace | Apr. 16, 1935 |
| 2,082,462 | Preston | June 1, 1937 |
| 2,089,455 | Wallace | Aug. 10, 1937 |
| 2,102,988 | Allen | Dec. 21, 1937 |
| 2,139,562 | Preston | Dec. 6, 1938 |
| 2,248,321 | Allen | July 8, 1941 |
| 2,333,974 | Bell | Nov. 9, 1943 |